US010409603B2

(12) United States Patent
Baghsorkhi et al.

(10) Patent No.: US 10,409,603 B2
(45) Date of Patent: Sep. 10, 2019

(54) PROCESSORS, METHODS, SYSTEMS, AND INSTRUCTIONS TO CHECK AND STORE INDICATIONS OF WHETHER MEMORY ADDRESSES ARE IN PERSISTENT MEMORY

(71) Applicant: Intel Corporation, Santa Clara, CA (US)

(72) Inventors: Sara S. Baghsorkhi, San Jose, CA (US); Christos Margiolas, Santa Claracal, CA (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 15/396,177

(22) Filed: Dec. 30, 2016

(65) Prior Publication Data

US 2018/0189062 A1   Jul. 5, 2018

(51) Int. Cl.
*G06F 9/30* (2018.01)
*G06F 12/10* (2016.01)
(Continued)

(52) U.S. Cl.
CPC .............. *G06F 9/3016* (2013.01); *G06F 3/06* (2013.01); *G06F 9/3004* (2013.01); *G06F 9/30043* (2013.01); *G06F 9/30058* (2013.01); *G06F 9/30101* (2013.01); *G06F 9/3885* (2013.01); *G06F 9/3889* (2013.01); *G06F 9/3891* (2013.01); *G06F 12/1009* (2013.01); *G06F 12/1027* (2013.01); *G06F 15/76* (2013.01);
(Continued)

(58) Field of Classification Search
CPC . G06F 9/3016; G06F 9/30043; G06F 12/1009
USPC ........................................................ 712/208
See application file for complete search history.

(56) References Cited

U.S. PATENT DOCUMENTS

RE37,305 E * 7/2001 Chang .................. G06F 11/073
711/206
8,819,392 B2 * 8/2014 Champagne ........ G06F 12/1027
711/108
(Continued)

FOREIGN PATENT DOCUMENTS

EP            0113240 A2     7/1984

OTHER PUBLICATIONS

Intel Corp. Intel® 64 and IA-32 Architectures Software Developer's Manual, vol. 1, Order No. 253665-060, Sep. 2016, Title page, p. iii to p. viii, p. 2-1 to p. 2-12, p. 5-1 to p. 5-8.*
(Continued)

*Primary Examiner* — Yuqing Xiao
(74) *Attorney, Agent, or Firm* — NDWE, LLP

(57) ABSTRACT

A processor of an aspect includes a decode unit to decode an instruction. The instruction is to indicate a source memory address information, and is to indicate a destination architecturally-visible storage location. The processor also includes an execution unit coupled with the decode unit. The execution unit, in response to the instruction, is to store a result in the destination architecturally-visible storage location. The result to indicate whether a logical memory address corresponding to the source memory address information is in a persistent memory. Other processors, methods, systems, and instructions are disclosed.

24 Claims, 17 Drawing Sheets

(51) Int. Cl.
   *G06F 12/1009* (2016.01)
   *G06F 12/1027* (2016.01)
   *G06F 9/38* (2018.01)
   *G06F 15/76* (2006.01)
   *G06F 3/06* (2006.01)

(52) U.S. Cl.
   CPC .. *G06F 2212/205* (2013.01); *G06F 2212/502* (2013.01)

(56) References Cited

U.S. PATENT DOCUMENTS

| | | | | |
|---|---|---|---|---|
| 2008/0109592 | A1* | 5/2008 | Karamcheti | G06F 9/5016 711/103 |
| 2009/0249021 | A1* | 10/2009 | Morris | G06F 8/316 711/202 |
| 2013/0185475 | A1* | 7/2013 | Talagala | G06F 12/0866 711/102 |
| 2015/0006834 | A1* | 1/2015 | Dulloor | G06F 3/0604 711/162 |
| 2016/0092223 | A1* | 3/2016 | Wang | G06F 9/3004 712/208 |
| 2016/0170645 | A1* | 6/2016 | Kumar | G06F 12/0842 711/170 |
| 2016/0170897 | A1* | 6/2016 | Solihin | G06F 12/1009 711/207 |
| 2018/0032439 | A1* | 2/2018 | Jenne | G06F 12/0891 |

OTHER PUBLICATIONS

Intel Corp. Intel® 64 and IA-32 Architectures Optimization Reference Manual, Oct. 2009, Order No. 248966-019, title page, p. iii to p. v, p. 2-1 to 2-19, p. 2-39.*

Joy Arulraj, Let's Talk About Storage & Recovery Method for Non-Volatile Memory Data Base System, Jun. 4, 2015, ACM Digital Library, ISBN: 978-1-4503-2758-9 DOI 10.1145/2723372.2749441.*

Elis R Giles, SoftWrap. A Lightwight Framework for Transactional Support of Storage Class Memory, May 30, 2015, IEEE, ISBN: 978-1-4673-7619-8, DOI: 10.1109/MSST.2015.7208276.*

Can We Have a Computer with Just Register as Memory, stackoverflow.com/questions/3798730/can-we-have-a-computer-with-just-registers-as-memory, pp. 1-11, 2010.*

Intel Corp., Intel® Architecture Instruction Set Extensions Programming Reference, Feb. 2016.*

Intel Corp., NVDIMM Namespace Specification, Apr. 2015.*

Extended European Search Report for Application No. 17202935.7, dated May 16, 2018, 9 pages.

* cited by examiner

FIG. 2

METHOD OF PERFORMING
PERSISTENT TYPE MEMORY
CHECK INSTRUCTION
224

RECEIVE PERSISTENT TYPE MEMORY CHECK INSTRUCTION INDICATING SOURCE MEMORY ADDRESS INFORMATION AND INDICATING DESTINATION ARCHITECTURALLY-VISIBLE STORAGE LOCATION ~226

STORE RESULT IN DESTINATION ARCHITECTURALLY-VISIBLE STORAGE LOCATION INDICATING WHETHER LOGICAL MEMORY ADDRESS CORRESPONDING TO SOURCE MEMORY ADDRESS INFORMATION IS IN PERSISTENT MEMORY ~227

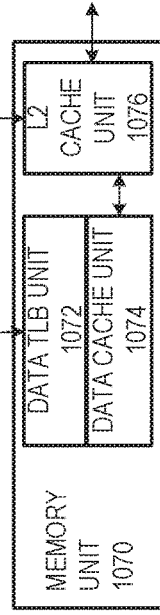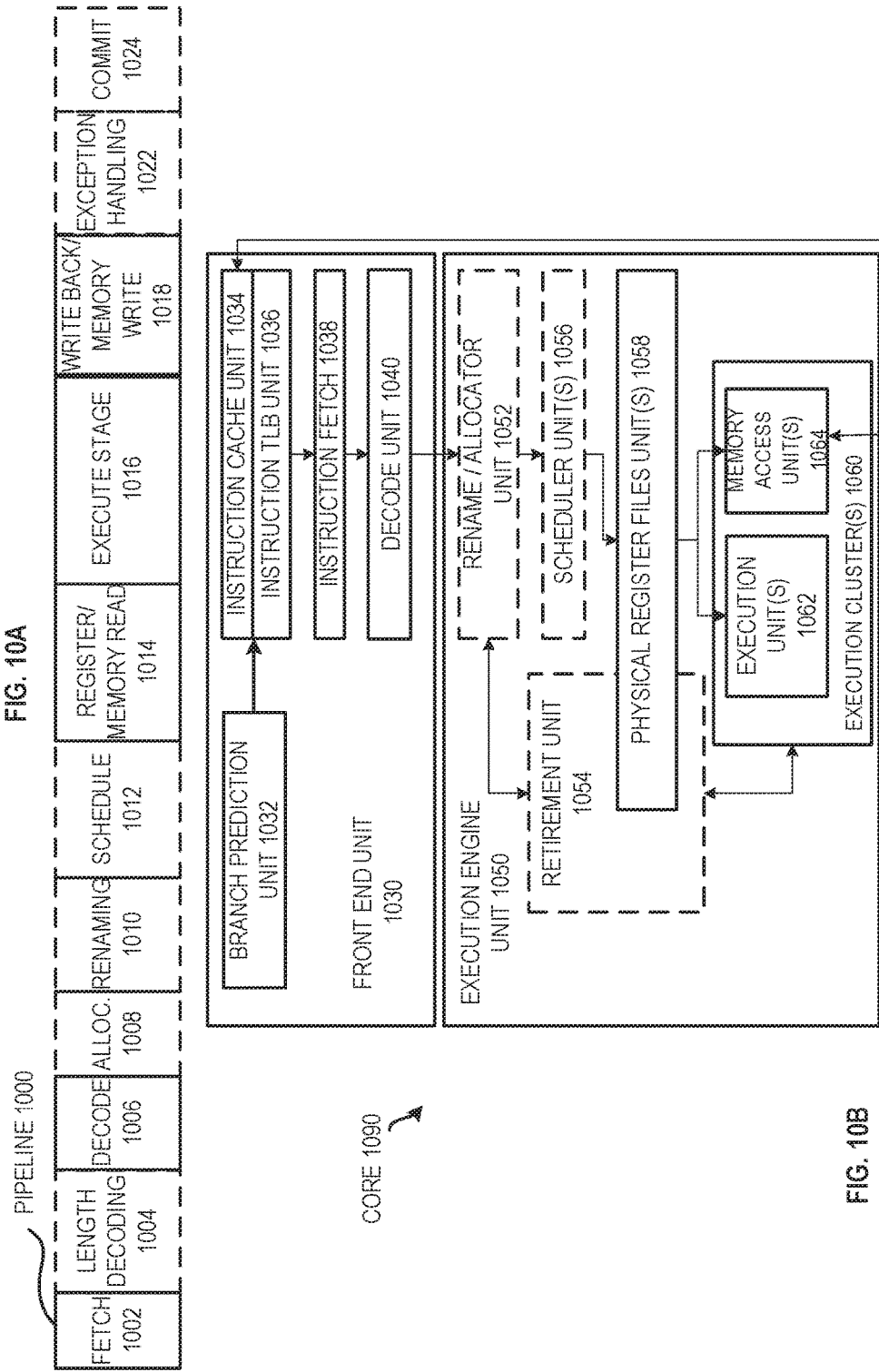

_US 10,409,603 B2_

PROCESSORS, METHODS, SYSTEMS, AND INSTRUCTIONS TO CHECK AND STORE INDICATIONS OF WHETHER MEMORY ADDRESSES ARE IN PERSISTENT MEMORY

BACKGROUND

Technical Field

Embodiments described herein generally relate to processors. More specifically, embodiments described herein generally relate to processors with architectural support for persistent memory.

Background Information

Processors may be used in various types of computer systems and other electronic devices that have main or primary memory. The main memory is typically addressable by (e.g., written to and read by) instructions of an instruction set of the processor. Volatile memory has conventionally been used for the main memory. One common type of volatile memory that is widely used is dynamic random access memory (DRAM). Such volatile memory typically loses its stored contents after relatively brief periods of time without power, after a system crash, after an operating system crash, after a reboot, and the like.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of a method of performing an embodiment of a persistent type memory check instruction.

FIG. 10A is a block diagram illustrating an embodiment of an in-order pipeline and an embodiment of a register renaming out-of-order issue/execution pipeline.

FIG. 10B is a block diagram of an embodiment of processor core including a front end unit coupled to an execution engine unit and both coupled to a memory unit.

DETAILED DESCRIPTION OF EMBODIMENTS

Disclosed herein are embodiments of instructions, embodiments of processors to perform the instructions, embodiments of methods of performing the instructions, embodiments of systems incorporating one or more processors to perform the instructions, and embodiments of programs or machine-readable mediums providing the instructions. In some embodiments, the processors may have a decode unit or other logic to receive and/or decode the instruction, and an execution unit or other logic or other portion of the processor to perform the instruction. In the following description, numerous specific details are set forth (e.g., specific instruction operations, microarchitectural details, processor configurations, sequences of operations, etc.). However, embodiments may be practiced without these specific details. In other instances, well-known circuits, structures and techniques have not been shown in detail to avoid obscuring the understanding of the description.

Figure 1:
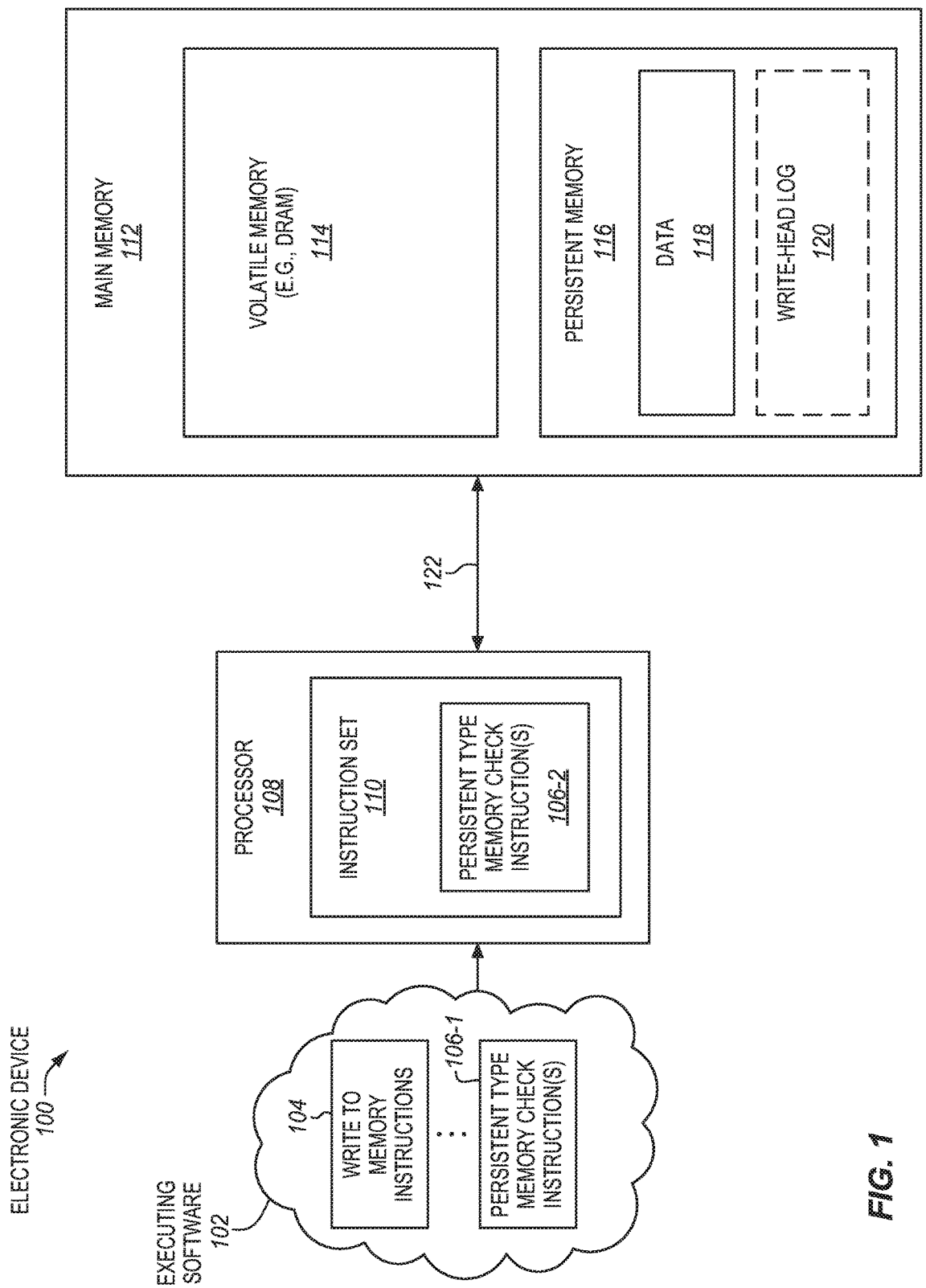
FIG. 1 is a block diagram of an electronic device in which embodiments of the invention may be implemented.

FIG. 1 is a block diagram of an electronic device 100 in which embodiments of the invention may be implemented. In various embodiments, the electronic device may represent a desktop computer, a laptop computer, a notebook computer, a tablet computer, a server, a network element (e.g., a router, switch, etc.), a smartphone, a smart television, a set-top box, a video game console, other type of computer system, or other type of electronic device.

The electronic device includes a processor 108. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, co-processors, graphics processors, embedded processors, and digital signal processors (DSPs).

The processor may have and/or support an instruction set architecture (ISA). The ISA represents a part of the architecture of the processor related to programming and commonly includes the native instructions, architectural registers, data types, addressing modes, memory architecture, and the like, of the processor. The ISA is distinguished from the microarchitecture, which generally represents the particular processor design techniques selected to implement the ISA. In various embodiments, the processor may have a complex instruction set computing (CISC) architecture, a reduced instruction set computing (RISC) architecture, a very long instruction word (VLIW) architecture, a hybrid architecture, other type of architectures, or have a combination of different architectures (e.g., different cores may have different architectures). As shown, the processor has an instruction set 110. The instructions of the instruction set may represent macroinstructions, machine instructions, or other instructions that the processor is natively able to decode.

The electronic device also includes a main memory 112. The processor and the main memory are coupled, or otherwise in communication with one another, by a conventional coupling mechanism 122 (e.g., through one or more buses, hubs, memory controllers, chipset components, or the like). The main memory may represent primary memory (e.g., as opposed to secondary memory or backing storage (not shown)). The main memory may be used to store software (e.g., system-level software, user-level applications, etc.) and data (e.g., data used by the software, media content, data structures, etc.). During operation, when the processor is running, the processor may perform instructions of executing software 102. These instructions may represent instructions of the instruction set 110, and may include various types of instructions, such as, for example, data processing instructions (e.g., arithmetic instructions, logical instructions, etc.) memory access instructions to access data in the main memory, etc. Examples of memory access instructions include load or read instructions to load or read data from the main memory, and write or store instructions (e.g., write to memory instructions 104) to write or store data to the main memory. The main memory is typically accessible by such memory access instructions of the instruction set, but the secondary memory or backing storage (not shown) typically is not (except perhaps for certain specialized instructions).

In some embodiments, the main memory 112 may include both volatile memory 114 and persistent memory 116. The volatile memory may be volatile or non-persistent in that it will generally lose its stored contents after a relatively short amount of time (e.g., typically less than a second without refresh) following a power failure, operating system failure, system crash, system reboot, or other such event. In contrast, the persistent memory may be persistent and/or durable in that it will generally not lose its stored contents even after much longer amounts of time (e.g., after at least hours) without power and/or following such an event.

In some embodiments, both the persistent memory 116 and the volatile memory 114 may be part of the processors addressable physical address space. For example, instructions of the instruction set 110 may be performed to access both the persistent memory and the volatile memory. In some embodiments, the persistent memory may be byte-addressable, as opposed to only being page and/or block addressable. In some embodiments, accesses to the persistent memory may be subject to a similar or the same processor memory model (e.g., with respect to the ability to be cached, with respect to the processor maintaining cache coherency, with respect to the processors memory ordering model) as accesses to the volatile memory.

One suitable type of the volatile memory 114 that is very commonly used is dynamic random access memory (DRAM). Examples of suitable types of the persistent memory 116 include, but are not limited to, natively non-volatile or persistent memory, and reliable power source backed volatile memory, and combinations thereof. Natively non-volatile or persistent memory is natively operative to retain its stored contents even after at least hours with no power applied. Examples of suitable types of natively non-volatile or persistent memory include, but are not limited to, those based on phase-change memory, resistive random-access memory, correlated electron random access memory (CeRAM), magnetoresistive random-access memory (MRAM), memristors (e.g., non-linear passive two-terminal electrical components relating electric charge and magnetic flux linkage), spin-transfer torque memory (e.g., that utilizes an effect in which the orientation of a magnetic layer in a magnetic tunnel junction or spin valve can be modified using a spin-polarized current), and combinations thereof, to name just a few examples. Other persistent memory technologies, as well as those developed in the future, may also optionally be used. The persistent memory may also be created by backing volatile memory (e.g., DRAM) with a sufficiently reliable power source, such as, for example, a battery, fuel cell, or the like, so that power is not lost in the event of a power failure and contents are not lost in the event of a system reboot or the like.

In the electronic device 100 that includes both the volatile memory 114 and the persistent memory 116, it may be useful and beneficial to provide a way for software (e.g., the executing software 102) to be able to know whether accesses to the memory (e.g., by the write to memory instructions 104) are being performed to the volatile memory or to the persistent memory. By way of example, one possible reason for this is that the software may want to know if writes or stores are being performed to the persistent memory to determine whether an optional write-ahead log 120 (e.g., an undo log and/or a redo log) should be updated as part of a write-ahead logging process. Write-ahead logging is often used (e.g., in database applications) to help maintain atomicity, persistency, and data integrity. In write-ahead logging, storage or modification of data in the persistent memory may be ordered chronologically behind corresponding updates to a write-ahead log (e.g., an undo log and/or a redo log). For example, before changing a given data in persistent memory, the old version of the given data in the persistent memory may be preserved, by copying it to an undo log in the persistent memory. In this way, if a power failure or other such failure occurs, before the storage or modification of the data in the persistent memory has completed, the write-ahead log may be used to help prevent unrecoverable data loss and/or recover to a known non-corrupted state (e.g., by replaying the modifications to the data preserved in the write-ahead log in reverse order).

However, such updates to the write-ahead log may have one or more of a time and/or performance and/or power cost. For example, such updates represent additional operations to be performed, and typically one or more serialization instructions may need to be performed which may tend to have a significant performance and/or time cost. Accordingly, in some embodiments, it may be useful and beneficial for software to be able to know if writes are being performed to the persistent memory, so a write-ahead log can be selectively updated when this is the case, but not when the writes are being performed to the volatile memory. Alternatively, the software may want to know whether writes or other accesses to a given memory location or address are to the persistent memory or to the volatile memory for other reasons subject to the creativity of the programmer (e.g., for purposes of monitoring and/or managing the persistent memory).

However, one challenge is that it sometimes is difficult and/or performance costly for software to be able to know whether memory locations being accessed are in persistent or volatile memory. For example, it may be difficult and/or performance costly to ensure persistency in the presence of memory pointers (e.g., memory addresses), especially for larger code bases, with complex data structures, and complex calling relationships between subroutines. The following code illustrates one example where this is the case:

```
persistent p_type *p_ptr;   //pointer to location in persistent memory
p_type *q_ptr;              //pointer to location in volatile memory
void foo(p_type *ptr){      //function "foo"
    *ptr = ...              //update *ptr within function foo
}
p_type *bar(...) {
    ...
    if(A[i]<min) {
        ptr = p_ptr;        //if condition update ptr to persistent pointer p_ptr
        ...
    }else{
        ptr = q_ptr;        //otherwise update ptr to volatile pointer q_ptr
    }
    ...
    return ptr;             //function bar returns ptr and it either points to persistent or volatile
}
int main( ){                //main function
    p_ptr = nvMalloc(sizeof(p_type));   //allocated in persistent memory
    q_ptr = malloc(sizeof(p_type));     //allocate in volatile memory
    ...
    ptr = bar(...);         //call "bar" with inputs (...). bar updates ptr to either p_ptr or q_ptr
    foo(ptr);               //function "foo" called with ptr
    ...
}
```

In this example, a persistent memory location P is allocated, initialized, and published by assigning the allocated address to a global persistent pointer p_ptr. Both a pointer to a location in persistent memory (p_ptr) and a pointer to a location in volatile memory (q_ptr) are used. The function "main" assigns a pointer "ptr" to an evaluation of another function "bar" with input parameters (e.g., represented by ( . . . ) such as runtime data). The function "bar" conditionally updates the pointer "ptr" to either the pointer to the location in persistent memory (p_ptr) or the pointer to the location in volatile memory (q_ptr) based on the input parameters "( . . . )" of function "bar". Then, when the function "bar" returns the pointer "ptr", it is input to another function "foo" which writes to the address/location in memory pointed to by its input "ptr." However, this location in memory pointed to by the input "ptr" may either be in persistent memory or volatile memory depending upon the conditions in function "bar" which depend upon the input parameters "( . . . )" such as runtime data. If the address/location pointed to is in persistent memory, then it may be desired to update a write-ahead log, before the function "foo" writes to the address/location in memory pointed to by the pointer "ptr". However, if the address/location pointed to is in the volatile memory, then it may be desired not to update the write-ahead log to avoid an associated performance penalty.

However, one challenge is that it often is difficult and/or costly for software and/or a compiler to be able to know for sure whether the pointer "ptr" that is input to the function "foo" points to persistent memory or volatile memory. For example, the compiler may not readily be able to ascertain or disambiguate the runtime data or other input parameters that may be needed to evaluate the conditions within the function "bar". One possible approach is for the compiler to conservatively always checkpoint data in the write-ahead log that is being written to at the pointer "ptr" in function foo by promoting "q_ptr" to a persistent pointer. However, a drawback with this approach is that sometimes data in volatile memory will be checkpointed in the write-ahead log, when it is not required (e.g., when it is really in volatile memory), thereby incurring the performance penalty of updating the write-ahead log when it is unnecessary. This is just one example, but illustrates an example of why it may be beneficial to be able to know if a memory address/location is in persistent or volatile memory. Accordingly, other approaches to allow software to be able to determine if a memory address/location is in persistent memory or volatile memory would be useful and beneficial.

Referring again to FIG. 1, in some embodiments, the instruction set 110 may include one or more types of persistent type memory check instructions 106-2. In some embodiments, each persistent type memory check instruction may broadly represent a memory attribute check instruction (e.g., a memory page attribute check instruction). In some embodiments, each of the one or more types of persistent type memory check instructions when performed may be operative to cause the processor to determine whether an associated address is in the persistent memory 116. In some embodiments, one or more of the persistent type memory check instructions 106-2 may be a user-level instruction that is operative to be performed at a user-level privileged (as well as privileged levels), as opposed to a privileged instruction that is only able to be performed at one or more privileged levels, but not at the user-level privilege.

One or more instances 106-1 of the one or more types of persistent type memory check instructions 106-2 may be included in the executing software 102 to allow the software to determine whether one or more associated memory addresses are in the persistent memory 116. For example, in some embodiments, a compiler may introduce such instances of the persistent type memory check instruction into code when it cannot sufficiently disambiguate or otherwise determine whether a memory address/location is in persistent memory or volatile memory. However, other uses of the persistent type memory check instruction are also possible and contemplated (e.g., this is a general-purpose instruction and programmers may use it for various or general-purpose uses subject to the creativity of the programmer).

FIG. 2 is a block flow diagram of an embodiment of a method 224 of performing an embodiment of a persistent type memory check instruction. In various embodiments, the method may be performed by a processor, instruction processing apparatus, digital logic device, or integrated circuit. In some embodiments, the method may be performed by the processor 108 and/or using the instruction 106-2. Alternatively, the method may be performed by and/or with a similar or different processor or apparatus and/or using a similar or different instruction. Moreover, the processor 108 may perform methods the same as, similar to, or different than the method 224.

The method includes receiving the persistent type memory check instruction, at block 226. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The persistent type memory check instruction may specify or otherwise indicate a source memory address information, and may specify or otherwise indicate a destination architecturally-visible storage location.

A result may be stored in the destination architecturally-visible storage location in response to and/or due to the persistent type memory check instruction, at block 227. The result may indicate whether or not a logical memory address corresponding to and/or associated with the source memory address information is in a persistent memory.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. In some embodiments, the microarchitectural operations to implement the instruction may optionally include accessing an indication of whether the memory address is in the persistent memory from a translation lookaside buffer (TLB) and/or performing a page table walk and accessing the indication from a page table entry in the event of a TLB miss (e.g., as described for FIG. 4). In some embodiments, the indication may optionally be provided in one of available bits [11:9] of the page table entry (e.g., as described for FIG. 5), although this is not required. In some embodiments, the instruction may optionally use a microarchitectural mask to mask or make the architected instruction agnostic to the specific bit in the page table entry used to provide the persistent indication (e.g., as described for FIG. 6). In some embodiments, the instruction may optionally be implemented as a special load operation and processed specially and/or efficiently by a memory order buffer (e.g., as described for FIG. 7).

Figure 3:
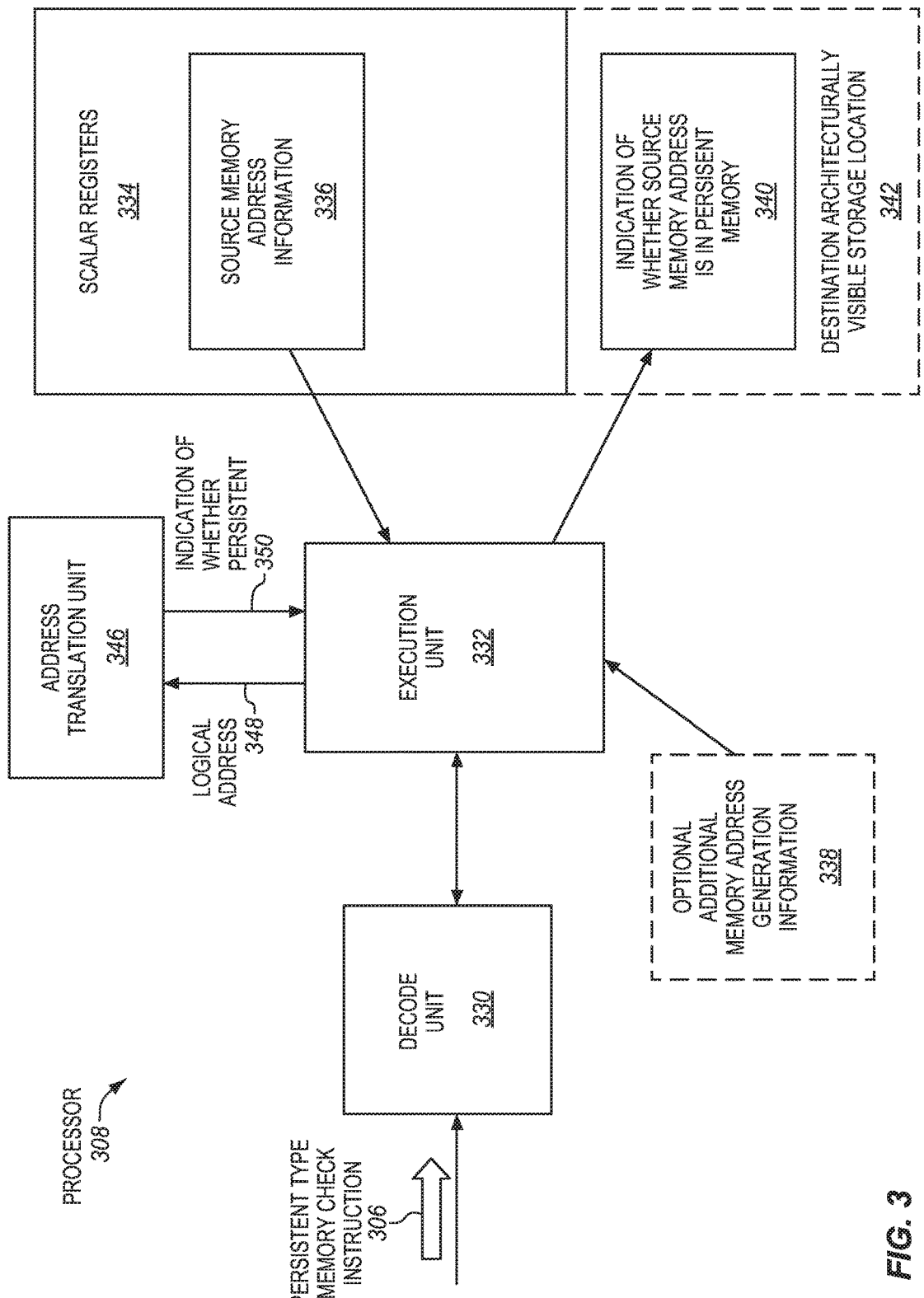
FIG. 3 is a block diagram of an embodiment of a processor that is operative to perform an embodiment of a persistent type memory check instruction.

FIG. 3 is a block diagram of an embodiment of a processor 308 that is operative to perform an embodiment of a persistent type memory check instruction 306. In some embodiments, the processor may be operative to perform the method 224 of FIG. 2. The components, features, and specific optional details described herein for the processor 308 and/or the instruction 306 of FIG. 3 also optionally apply to the method 224. Alternatively, the method 224 may be performed by and/or with a similar or different processor or apparatus and/or using a similar or different instruction. Moreover, the processor 308 may perform methods the same as, similar to, or different than the method 224. The processor may be any of the various types previously described for the processor 108 of FIG. 1 (e.g., a general-purpose processor, a special-purpose processor, have a CISC, RISC, or VLIW architecture, etc.). In some embodiments, the processor 308 may be integrated or disposed on at least one integrated circuit or semiconductor die and may include at least some hardware (e.g., transistors, integrated circuitry, on-die non-volatile memory storing microcode or other hardware-level instructions, or the like).

During operation, the processor may receive the persistent type memory check instruction 306. For example, the instruction may be received from memory on an interconnect. In some embodiments, the persistent type memory check instruction may broadly represent a memory attribute check instruction (e.g., a memory page attribute check instruction). The instruction may represent a macroinstruction, machine code instruction, machine language instruction, or other instruction of an instruction set of the processor.

In some embodiments, the persistent type memory check instruction 306 may explicitly specify (e.g., through one or more fields or a set of bits), or otherwise indicate (e.g., implicitly indicate), a source memory address information 336. The source memory address information may represent a source operand of the instruction. In some embodiments, the instruction may optionally explicitly specify (e.g., through one or more fields or a set of bits), or otherwise indicate (e.g., implicitly indicate), a destination architecturally visible storage location 342 where a result or result operand of the persistent type memory check instruction is to be stored.

The persistent type memory check instruction may specify or indicate the source memory address information 336 and/or the destination architecturally visible storage location 342 in different ways in different embodiments. As one possible approach, the instruction may have source and/or destination operand specification fields within its instruction encoding to specify registers, memory locations, or other storage locations for the operands. By way of example, the instruction may optionally have a first field to specify a first register that is to store the source memory address information and a second field to specify a second register that is to be used to store the result. As another possible approach, a register, memory location, or other storage location may optionally be inherent or otherwise implicit to the instruction (e.g., its opcode), without the instruction needing to have any non-opcode bits to explicitly specify the storage location. In such an approach, the processor may inherently or otherwise implicitly understand to use the implicit storage location for the operand based on the recognition of the opcode. As one illustrative example, the instruction may optionally have a first field to specify a source/destination register that is initially to store the source memory address information 336, and it may be implicit to reuse the source/destination register as the destination architecturally visible storage location 342 to store the result. As another illustrative example, the instruction may optionally have an implicit register that is initially to store the source memory address information 336. As yet another possible approach, the instruction may have an immediate field in its instruction encoding to provide the source memory address information 336. Combinations of such approaches may also optionally be used.

As shown, in some embodiments, the source memory address information 336 and the destination architecturally visible storage location 342 may optionally be in a set of general-purpose registers or other scalar registers 334 of the processor, although the scope of the invention is not so limited. Each of the scalar registers 334 may represent an on-die (or on integrated circuit) storage location that is operative to store data in a scalar (e.g., non-packed) format. The registers may represent architecturally-visible or architectural registers that are visible to software and/or a programmer and/or are the registers indicated by instructions of the instruction set of the processor to identify operands. These architectural registers are contrasted to other non-architectural registers in a microarchitecture (e.g., temporary registers, reorder buffers, etc.). The registers may be implemented in different ways in different microarchitectures and are not limited to any particular design. Examples of suitable types of registers include, but are not limited to, dedicated physical registers, dynamically allocated physical registers using register renaming, and combinations thereof. In other embodiments, the source memory address information 336 and/or the destination architecturally visible storage location 342 may not be in the scalar registers 334. For example, the destination architecturally visible storage location may instead optionally be one or more bits in a flags register, status register, condition code register, or the like, or another storage location (e.g., a location in memory). As another example, the source memory address information may optionally be provided by an immediate of the persistent type memory check instruction, or in another storage location (e.g., a location in memory).

Referring again to FIG. 1, the processor includes a decode unit 330. The decode unit is also sometimes referred to as a decoder. The decode unit may receive and decode the persistent type memory check instruction 306. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level persistent type memory check instruction. In some embodiments, the decode unit may include at least one input structure (e.g., a port, interconnect, or interface) to receive the persistent type memory check instruction, an instruction recognition and decode logic coupled therewith to recognize and decode the persistent type memory check instruction, and at least one output structure (e.g., a port, interconnect, or interface) coupled therewith to output the lower-level instruction(s) or control signal(s). The decode unit and/or its instruction recognition and decode logic may be implemented using various mechanisms including, but not limited to, microcode read only memories (ROMs), look-up tables, hardware implementations, programmable logic arrays (PLAs), other mechanisms suitable to implement decode units, and combinations thereof. In some embodiments, the decode unit may be included on a die, integrated circuit, or semiconductor substrate. In some embodiments, the decode unit may include at least some hardware (e.g., one or more of transistors, integrated circuitry, on-die read-only memory or other non-volatile memory storing microcode or other hardware-level instructions, etc.).

In some embodiments, instead of the persistent type memory check instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the persistent type memory check instruction, which may be of a first instruction set, and may emulate, translate, morph, interpret, or otherwise convert the persistent type memory check instruction into one or more corresponding intermediate instructions or control signals, which may be of a second different instruction set. The one or more intermediate instructions or control signals of the second instruction set may be provided to a decode unit (e.g., decode unit 330), which may decode them into one or more lower-level instructions or control signals executable by native hardware of the processor (e.g., one or more execution units).

Referring again to FIG. 3, the execution unit 332 is coupled with the decode unit 330. In some embodiments, the execution unit may be on a die or integrated circuit (e.g., with the decode unit and optionally all the illustrated components of the processor). The execution unit may receive the one or more decoded or otherwise converted instructions or control signals that represent and/or are derived from the persistent type memory check instruction. The execution unit 332 is also coupled with the source memory address information 336 (e.g., is coupled with the scalar registers 334) and may receive the source memory address information. The execution unit 332 is also coupled with the destination architecturally visible storage location 342. In some embodiments, the execution unit may be operative in response to and/or due to the persistent type memory check instruction (e.g., in response to one or more instructions or control signals decoded from the instruction and/or in response to the instruction being decoded and/or in response to the instruction being provided to a decoder) to perform operations to implement the persistent type memory check instruction.

In some embodiments, the execution unit 332 may be operative in response to and/or due to the persistent type memory check instruction 306 to use the source memory address information 336, and in some embodiments optional additional address generation information 338, to access an address translation unit 346 using a virtual memory address, a linear memory address, or other logical memory address (LA) 348. The address translation unit is coupled with the execution unit.

In some embodiments, the source memory address information 336 may represent the fully formed logical memory address 348. In such embodiments, there is no need for the optional additional memory address generation information 338 to generate the logical memory address. In other embodiments, both the source memory address information 336, and the optional additional memory address generation information 338, may be used in combination to generate the logical memory address 348. This may be done in different ways for different known suitable memory addressing modes or mechanisms. By way of example, the source memory address information may optionally include a memory index or displacement, and the optional additional memory address generation information may include one or more of a scale factor, a base, and a segment. Other types of optional additional memory address generation information 338 may potentially be used for other memory addressing modes or mechanisms. The scope of the invention is not limited to any specific type of source memory address information 336 and/or any specific type of memory addressing mode or mechanism. The optional additional memory address generation information 338 may often be stored in one or more special-purpose memory address generation registers or other storage locations of the processor that do not need to be specified by the instruction.

In virtualized memory, the software that is being performed on the processor may not access a memory directly using physical memory addresses. Instead, the software may access the memory through virtual, linear, or other logical memory addresses. The logical address space or memory may be divided into blocks known as pages (e.g., of one or more sizes). The pages of the logical memory may be mapped to physical memory locations, such as blocks (e.g., of the same size) in the physical address space or memory known as memory frames or physical frames. The address translation unit 346 may be operative to translate input logical memory addresses to corresponding output physical memory addresses. In some embodiments, the address translation unit 346 may also be operative to provide to the execution unit an indication 350 of whether the logical memory address/location 348 is in persistent memory (e.g., as opposed to volatile memory). For example, this indication may indicate whether the logical memory address 348 is translated into or otherwise corresponds to (e.g., in a translation lookaside buffer entry and/or page table entry) a physical memory address within the persistent memory.

In some embodiments, the execution unit 332 may be operative in response to and/or due to the persistent type memory check instruction 306 to store an indication 340 of whether the source memory address corresponds to persistent memory in the destination architecturally visible storage location 342. In some embodiments, the source memory address may correspond to the persistent memory when the logical address 348 translates to, or is otherwise mapped to, or otherwise corresponds to, a physical memory address that is within the persistent memory. The indication 340 represents a result or result operand of the persistent type memory check instruction.

As shown, in some embodiments, the destination architecturally visible storage location 342 may optionally be one of the set of general-purpose registers or other scalar registers 334, although this is not required. In some embodiments, if desired, only the persistent indication may be stored in the destination storage location. For example, a single bit may be stored and the single bit may have a first value (e.g., be set to binary one according to one possible convention) to indicate that the memory address/location is in the persistent memory, or a second value (e.g., be cleared to binary zero) if the memory address/location is in volatile memory. The other convention is also possible. In other embodiments, if desired, the persistent indication, as well as optionally one or more, optionally any combination, or optionally all, of the other memory attributes (e.g., memory page attribute bits in a TLB entry or page table entry) may be stored in the destination storage location.

Alternatively, in other embodiments, the destination architecturally visible storage location may be one or more flags and/or a flags register. As used herein the term flags broadly encompasses flags, as well as analogous bits or indications referred to by other names, such as, for example, status bits, bits in a status register, status indicators, condition code bits, bits in a condition code register, condition codes, and the like. Likewise, as used herein the term flags register broadly encompasses a flags register, as well as analogous registers or storage locations referred to by other names, such as, for example, a status register, condition code register, and the like. Any of the available flags may optionally be used. The architectural names and/or conventional typical uses of the flags may not be reflected in their use to store the indications of whether a memory address corresponds to persistent memory as disclosed herein. For example, the zero flag may optionally be used to indicate whether a source memory address of an instruction corresponds to persistent memory (e.g., instead of providing a zero indication as conventional).

One possible advantage of using the one or more flags is that often the instruction set of the processor may include one or more jump instructions, branch instructions, or other conditional control flow transfer instructions, which may perform a jump, branch, or other conditional control flow transfer operation based on the flags. This may allow control flow transfer to be performed directly using the result of the persistent type memory check instruction. That is, in some embodiments, the destination architecturally visible storage location of the persistent type memory check instruction may be a source operand, in some cases an implicit source operand, of one or more conditional control flow transfer instructions (e.g., a conditional branch or jump instruction).

The execution unit and/or the processor may include specific or particular logic (e.g., transistors, integrated circuitry, or other hardware potentially combined with firmware (e.g., instructions stored in non-volatile memory)) that is operative to perform the persistent type memory check instruction and/or store the result in response to and/or as a result of the persistent type memory check instruction (e.g., in response to one or more instructions or control signals decoded from the persistent type memory check instruction). In some embodiments, the execution unit may include at least one input structure (e.g., a port, interconnect, or interface) to receive the source memory address information 336, and in some cases the optional additional memory address generation information 338, circuitry or logic coupled therewith to generate the logical address 348, circuitry or other logic coupled to provide the logical address 348 to the address translation unit 346 and receive the indication 350, and at least one output structure (e.g., a port, interconnect, or an interface) coupled therewith and coupled with the destination architecturally visible storage location to output the result operand. In some embodiments, the execution unit may optionally include the circuitry or other logic shown and described for FIG. 6, which is an illustrative example of a suitable micro-architecture for the execution unit, although the scope of the invention is not so limited.

It is to be appreciated that the execution unit 332 to perform the persistent type memory check instruction is not limited to a single discrete unit that performs all operations to perform the persistent type memory check instruction. Rather, the execution unit may optionally include separate or distributed portions of logic to perform such operations. As one example, the execution unit may include logic of and/or to interface with an address generation unit, logic of and/or to interface with one or more TLBs, and logic of and/or to interface with an MMU, logic of and/or to interface with a memory order buffer, logic of and/or to interface a reservation station to update a destination architectural register, or a combination thereof. As used herein, the term "execution unit" broadly encompasses either a single discrete unit, or separate distributed portions of logic that work together, and collectively represent the execution unit to perform the persistent type memory check instruction. Moreover, in some embodiments, the execution unit may be included within a memory subsystem of the processor. In such embodiments, the memory subsystem of the processor may perform the operations described herein to implement the persistent type memory check instruction and store a result as described herein for the persistent type memory check instruction.

Advantageously, the persistent type memory check instruction may allow software (e.g., user-level software) to determine whether a memory location is in persistent memory. A first alternate possible approach would be for the software (e.g., user-level software) to perform a special OS system call to have software walk through the page tables and read a persistent indication from a page table entry, although this generally tends to have a significantly higher performance cost due to invoking the system call, flushing out the pipeline, doing the page table walk in software, etc. A second alternate possible approach would be to use fat pointers to disambiguate the pointer type. However, fat pointers generally have higher implementation overhead and/or an additional operation to compute the virtual address for each memory operation independent of its type. Accordingly, an approach that does not rely on fat pointers would be beneficial. A third related alternate possible approach would be to use the currently unused upper bit(s) of a virtual address to mark whether the address points to a location in persistent memory. Basically, the virtual address space may be statically divided between volatile and non-volatile memory and the upper bits may indicate these divisions. However, one possible drawback with this approach is that there may be no guarantee that the uppers bit(s) used for the marking are not currently used by software for other purposes and/or promoting a consistent worldwide use of these bit(s) may be challenging. Another possible drawback is that certain pointer arithmetic operations may toggle/modify the marking bit(s) unintentionally. The pointers of such an approach may also represent a special type of fat pointer and certain drawbacks associated therewith.

To avoid obscuring the description, a relatively simple processor 308 has been shown and described. However, the processor may optionally include other processor components. For example, various embodiments may include various combinations and configurations of the components shown and described for any of FIGS. 10B, 11A, 11B, 12.

Figure 4:
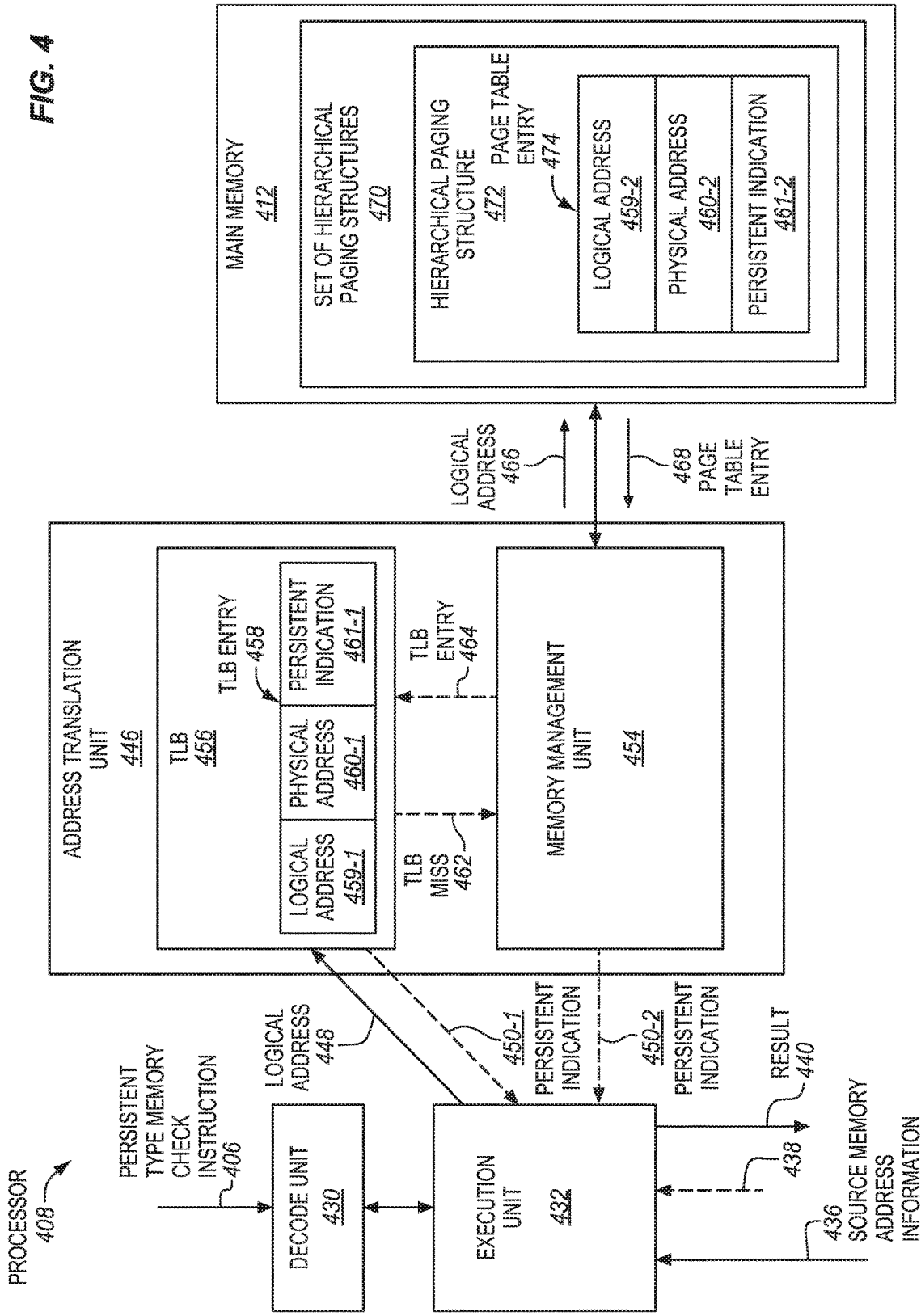
FIG. 4 is a block diagram of an embodiment of a processor that is operative to perform an embodiment of a persistent type memory check instruction, and which has a detailed example embodiment of an address translation unit.

FIG. 4 is a block diagram of an embodiment of a processor 408 that is operative to perform an embodiment of a persistent type memory check instruction 306, and which has a detailed example embodiment of an address translation unit 446. The processor 408 may optionally be the same as, similar to, or different than, the processor 308 of FIG. 3 and/or the processor 108 of FIG. 1. The processor includes a decode unit 430 and an execution unit 432. Each of these components may optionally be the same as, similar to, or different than, the correspondingly named components of FIG. 3. To avoid obscuring the description, the different and/or additional characteristics of the embodiment of FIG. 4 will primarily be described, without repeating all the characteristics which may optionally be the same as, or similar to, those previously described for FIG. 3.

The decode unit 430 may receive and decode a persistent type memory check instruction 406. An execution unit 432 is coupled with the decode unit. The execution unit may perform the persistent type memory check instruction. The execution unit may receive source memory address information 436 indicated by the persistent type memory check instruction. In some embodiments, the execution unit may also optionally receive additional memory address generation information 438. Such information may be the same as, similar to, or different than that previously described for FIG. 3.

In some embodiments, the execution unit 432 may be operative in response to and/or due to the persistent type memory check instruction 406 to use the source memory address information 336, and in some embodiments optionally additional address generation information 338, to access the address translation unit 446 using a virtual, linear, or other logical memory address 448. The address translation unit is coupled with the execution unit. The address translation unit may be operative to determine a corresponding physical memory address for the logical memory address (e.g., to identify the corresponding physical page in memory whether it is in persistent memory).

As shown, the address translation unit 446 may have at least one translation lookaside buffer (TLB) 456. In some cases there may optionally be a single TLB. In other cases there may optionally be multiple TLBs (e.g., at different levels). Each TLB may cache or otherwise store previously determined logical memory address to physical memory address translations. For example, after page table walks have been performed to translate logical memory addresses to corresponding physical memory addresses, the address translations may be cached in the at least one TLB. Subsequently, if the cached address translations are needed again, within a short enough period of time, then the address translations may be retrieved relatively quickly from the at least one TLB, instead of repeating the relatively slower page table walks. Each TLB may have different entries to store different address translations corresponding to different logical memory addresses.

The logical memory address 448 may be provided as a lookup parameter, search key, or other input to the at least one TLB 456. As shown, a representative TLB entry 458 in the at least one TLB 456, when the processor is in operation or use, may cache a corresponding address translation. The representative TLB entry may have a corresponding logical memory address 459-1 and its corresponding mapped physical memory address 460-1. In some embodiments, the TLB entry may also include a persistent indication 461-1. The persistent indication may include one or more bits. The persistent indication may indicate whether the corresponding physical memory address is in persistent memory. As one possible example, the persistent indication may include a single bit in the TLB entry, which according to one possible convention, may be set to binary one to indicate that the memory location is in persistent memory, or cleared to binary zero to indicate that the memory location is not in persistent memory. The opposite convention is also possible. Other entries in the at least one TLB may store analogous data for different corresponding address translations (e.g., different corresponding logical memory addresses). Each TBL entry may also have a corresponding page table entry, in a set of hierarchical paging structures 470, which stores the same type of information, although possibly arranged differently and/or having a different format.

An address translation for the logical memory address 448 either will, or will not, be stored in the at least one TLB 456. A TLB "hit" occurs when the appropriate address translation is stored in the at least one TLB. In the event of a TLB "hit," in some embodiments, the corresponding persistent indication 450-1, which may indicate whether the mapped or corresponding physical memory address is in persistent memory, may be returned to the execution unit 432. Conversely, a TLB "miss" 462 may occur when the appropriate address translation, and the corresponding appropriate persistent indication, are not stored in the at least one TLB. In the event of the TLB "miss," a page table walk may be performed. The TLB may signal the TLB miss 462 to a memory management unit (MMU) 454. The memory management unit is also sometimes referred to as a page miss handler, page table walk unit, or the like. The MMU may broadly represent, or at least include, on-die logic of the processor that is operative to perform a page table walk and/or obtain an address translation from the set of hierarchical paging structures 472 which may be stored in main memory 412. The MMU may be implemented in on-die hardware (e.g., transistors, integrated circuitry, etc.), on-die firmware (e.g., non-volatile memory and hardware-level instructions stored therein), software (e.g., instructions stored in the main memory), or a combination thereof (e.g., predominantly hardware and/or firmware potentially/optionally combined with a lesser amount of software).

The MMU 454 may perform a page table walk to translate the logical memory address 448 to a corresponding physical memory address, and determine the corresponding persistent indication. The MMU may use the logical address 466 (e.g., which may be same as the logical address 448) to access the set of hierarchical paging structures 470. Conventional hierarchical paging structures are suitable except that their page table entries may be adapted to have bits, fields, or other portions to store the corresponding persistent indications. The MMU may be operative to "walk" or advance through the set of hierarchical paging structures until ultimately reaching a hierarchical paging structure 472 that has a page table entry 474 having the sought address translation for the logical memory address 448. The page table entry 474 may have the corresponding logical memory address 459-2 and its corresponding mapped physical memory address 460-2. In some embodiments, the page table entry may also include a persistent indication 461-2. The persistent indication may include one or more bits. The persistent indication may indicate whether the corresponding physical memory address for that entry is in persistent memory. As one possible example, the persistent indication may include a single bit in the page table entry, which according to one possible convention, may be set to binary one to indicate that the memory location is in persistent memory, or cleared to binary zero to indicate that the memory location is not in persistent memory. The opposite convention is also possible. In some embodiments, system level software, such as, for example, an operating system, virtual machine monitor, hypervisor, or the like, may configure the persistent indication (e.g., change the value of the bit) when the corresponding page is allocated (e.g., when an application requests allocation (e.g., by performing nvMalloc or malloc)) dependent on whether it is allocated in persistent or volatile memory. Other page table entries in the set of hierarchical paging structures may store analogous data for different corresponding address translations (e.g., different corresponding logical memory addresses).

In some embodiments, the execution unit may receive a persistent indication 450-2 (e.g., a copy of or otherwise representing the persistent indication 461-2 from the page table entry having the appropriate address translation). The persistent indication 450-2 may indicate whether the physical memory address corresponding to the logical address 448 is in persistent memory. Without limitation, the determined address translation, including the determined persistent indication, may also optionally be stored 464 to a TLB entry in the at least one TLB for possible future use. In some embodiments, the address translation unit 446 and/or the memory management unit 454 may optionally be operative to directly provide the persistent indication 450-2 to the execution unit. In other embodiments, the address translation unit 446 and/or the memory management unit 454 may optionally store 464 the address translation in a TLB entry in the at least one TLB, and then the execution unit may access the persistent indication from the at least one TLB as previously described.

Figure 5:
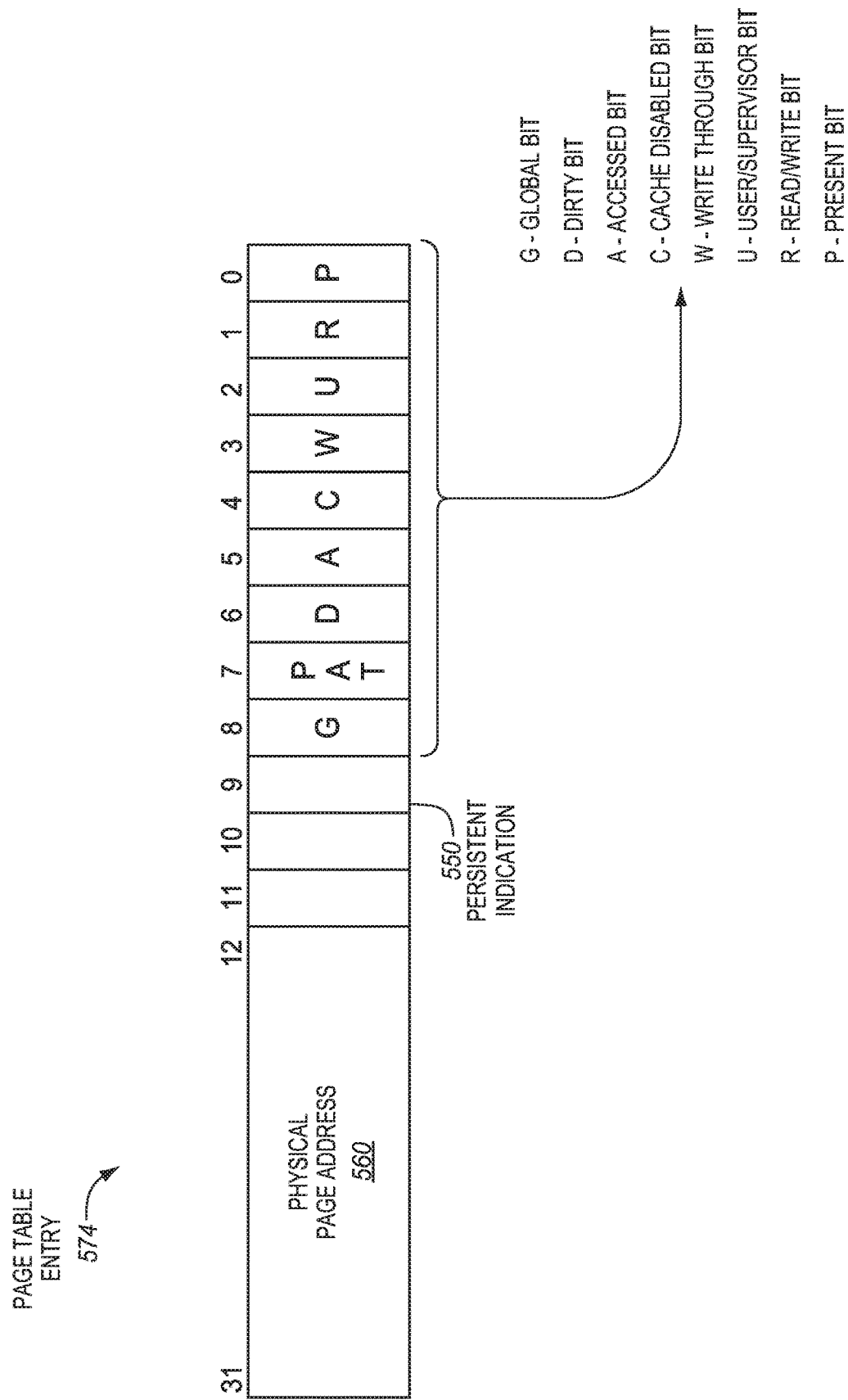
FIG. 5 is a block diagram of a detailed example embodiment of a suitable page table entry.

FIG. 5 is a block diagram of a detailed example embodiment of a suitable page table entry 574. The page table entry has 32-bits. Bit[0] represents a present bit that is to indicate whether the page is currently present in memory. BA[1] represents a read/write bit that is to indicate whether the page is read only or read/write. Bit[2] represents a user/supervisor bit that is to indicate whether the page has user or supervisor priviledge. Bit[3] represents a write-through bit that is to control a write through or write back caching policy for the page. Bit[4] represents a cache disabled bit to control caching of the page. Bit[5] represents an accessed bit that is to indicate whether the page has been accessed (written or read). Bit[6] represents a dirty bit that is to indicate whether the page has been written to. Bit[7] represents a page table attribute index bit. Bit[8] represents a global page bit.

Bits [11:9] are currently available. In some embodiments, one or more of bits [11:9], in this specific example bit[9], may optionally be used to store a persistent indication 550 as disclosed elsewhere herein, to indicate whether the corresponding page is stored in persistent memory. By way of example, system software may configure bit[9], for example, when a page is allocated in order to indicate whether that page is allocated in volatile or persistent memory. Bits [31:12] represent a physical page address field 560.

Figure 6:
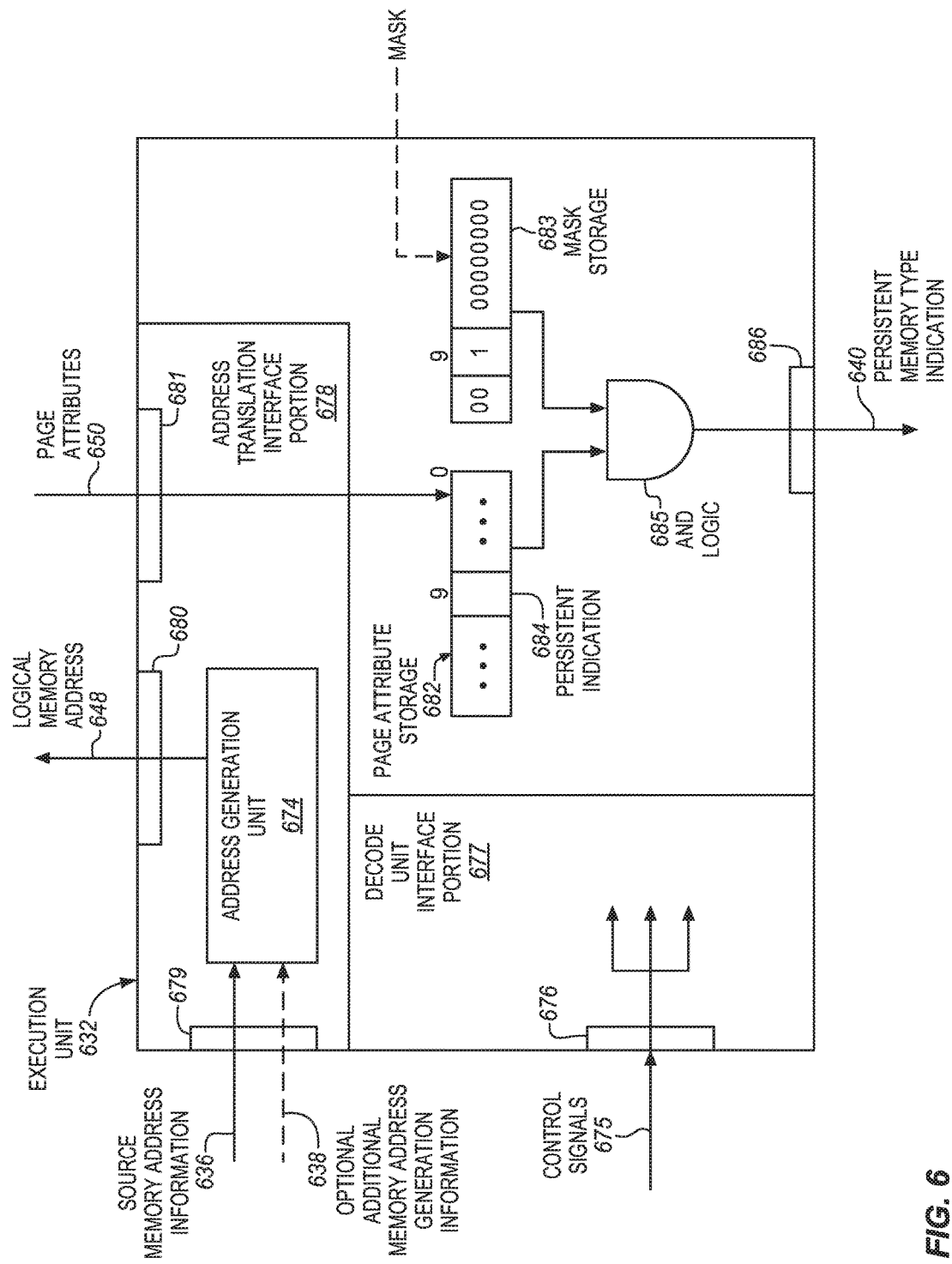
FIG. 6 is a block diagram of a detailed example embodiment of an execution unit to execute an embodiment of a persistent type memory check instruction.

FIG. 6 is a block diagram of a detailed example embodiment of an execution unit 632 to execute an embodiment of a persistent type memory check instruction. In some embodiments, the execution unit 632 may optionally be used as the execution unit 332 of FIG. 3 and/or the execution unit 432 of FIG. 4. Alternatively, the execution unit 332 and/or the execution unit 432 may optionally be similar to, or different than, the execution unit 632.

The execution unit 632 includes a decode unit interface portion 677 to interface with a decode unit (e.g., decode unit 330 or decode unit 430). The execution unit and/or the decode unit interface portion may include an input structure 676 (e.g., a port, interconnect, or interface) to receive control signals decoded or otherwise derived from the persistent type memory check instruction. The decode unit may include internal interconnects to distribute the control signals throughout its various components.

The execution unit also includes an address translation interface portion 678 to interface with an address translation unit (e.g., 346 or 446). The execution unit and/or the address translation interface portion may include an input structure 679 (e.g., a port, interconnect, or interface) to receive source memory address information 636, and optionally additional memory address generation information 638. These may be provided to an address translation unit 674 which may use them to generate a logical memory address 648 that may be provided to the address translation unit through an output structure 680 (e.g., a port, interconnect, or interface). The execution unit and/or the address translation interface portion may include an input structure 681 (e.g., a port, interconnect, or interface) to receive input page attributes 650 corresponding to the logical memory address from the address translation unit.

In some embodiments, the execution unit may optionally be operative to use a microarchitectural mask to isolate a persistent type memory indication of the received page attributes. The mask may be stored in a mask storage 683 (e.g., a non-architectural or temporary register). The received page attributes may be stored in a page attribute storage 682 (e.g., a non-architectural or temporary register). In the illustrated example, available bit[9] of the page attributes includes the persistent type memory indication, although this is just one illustrative example. For this example, the microarchitectural mask may have a value, starting with the least significant bit, of "00000000100 . . . " where bits[8:0] are cleared, bit[9] is set, and bit[10] and all more significant bits are cleared. The page attributes and the microarchitectural mask may be provided to logical AND logic 685 (e.g., one or more AND gates). The AND logic may be operative to perform a bitwise logical AND operation on the page attributes and the microarchitectural mask. In the illustrated example, since only bit[9] of the microarchitectural mask is set to binary one and all other bits are cleared to binary zero, this isolates bit[9] of the page attributes which in this example is the persistent type memory indication bit.

One possible advantage to such use of a microarchitectural mask is that it may be used to conceal or not architecturally expose the specific bit of the page attributes that is used to provide the persistent type memory indication to software. Rather, the specific bit may be abstracted away or concealed by the microarchitecture of the execution unit. One possible advantage of this is that it may help to allow the specific bit to be changed if desired. For example, if it is desired instead to use a different one of the page attribute bits (e.g., available bit[10] to provide the indication, then the microarchitectural mask may be changed. For example, instead of the microarchitectural mask "00000000100 . . . " the microarchitectural mask "00000000010 . . . " may be used instead. Yet another mask may be used if it is desired to instead use available bit[11] of the page attributes. In this way, the persistent type memory check instruction itself may not require or impose a restriction that any specific bit in a TLB entry or page table entry be used, but rather may be agnostic to the specific bit used due to the microarchitectural mask. This may allow existing code including the persistent type check instruction to be used (e.g., without needing to be recompiled) even if it is decided to change the page attribute bit that is used to provide the persistent type memory indication, if it is possible to change the microarchitectural mask. In some embodiments, the execution unit may optionally allow the microarchitectural mask to be programmed (e.g., by loading and storing a microarchitectural mask value into the mask storage 683 from the basic input/output system (BIOS)) or otherwise changed (e.g., by selecting between multiple on-die hardwired masks, etc.).

The execution unit may also include an output structure 686 (e.g., a port, interconnect, or interface) to provide the persistent type memory indication 640 to a destination architecturally visible storage location. It is to be appreciated that this is just one illustrative example embodiment of a suitable execution unit. Other suitable execution units need not use such a microarchitectural mask, the AND logic, etc.

Figure 7:
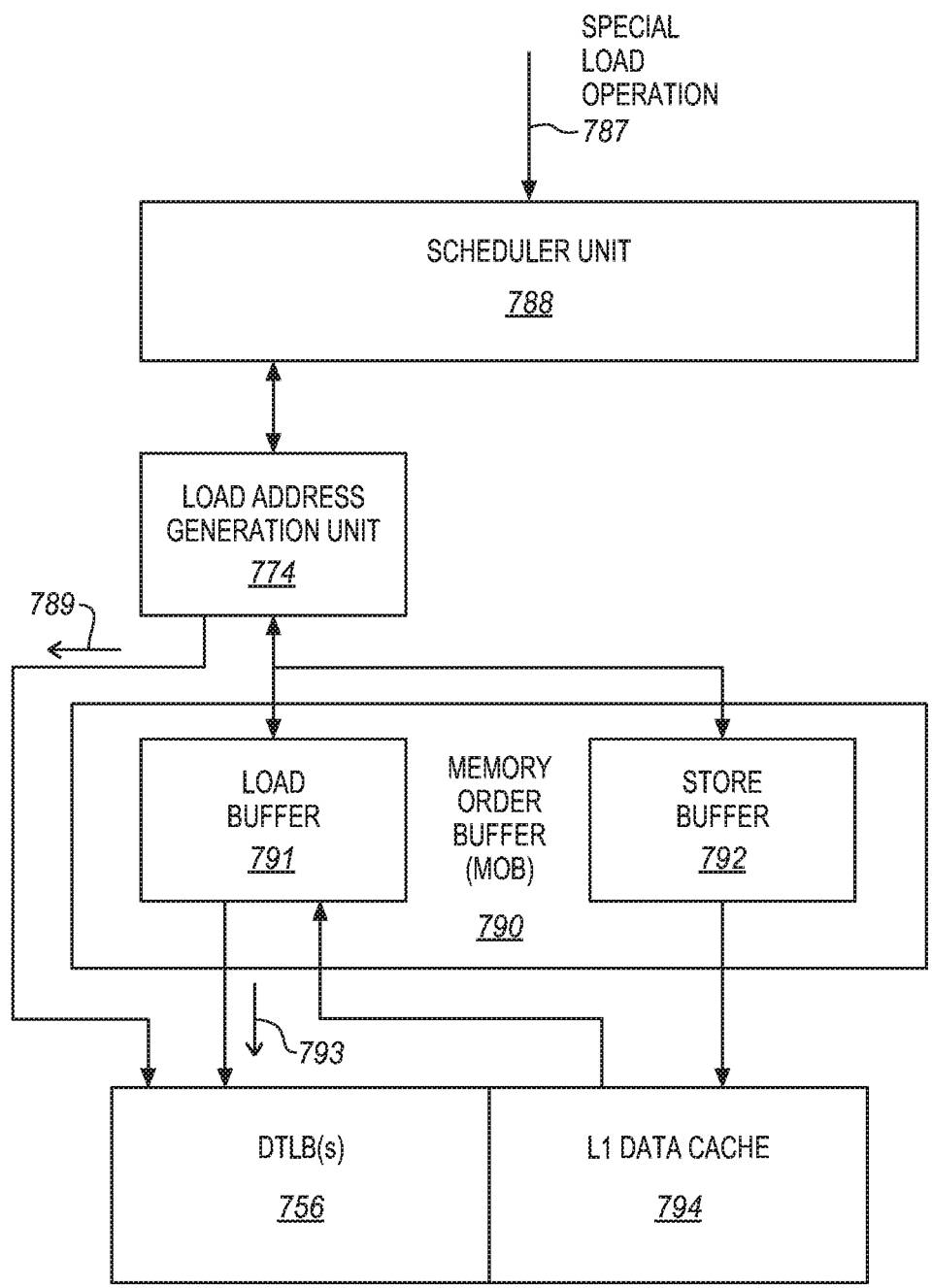
FIG. 7 is a block diagram of a detailed example embodiment of a way of performing a special load operation to perform a persistent type memory check instruction.

FIG. 7 is a block diagram of a detailed example embodiment of a way of performing a special load operation to perform a persistent type memory check instruction. In some embodiments, the persistent type memory check instruction may optionally be implemented using a special load microoperation or other special load operation 787. The special load operation may be special in that it may not actually load data from memory, may obtain a persistent type memory indication as described elsewhere herein, and may be processed differently in some ways by the processor.

The special load operation 787 may be provided to a reservation station or other scheduler unit 788 for dispatch. After the load operation is dispatched from the scheduler unit, its operation identifier along with its source and destination tags may be transmitted on to a bus. Initially, a logical memory address 789 corresponding to its source memory address information may be provided directly from a load address generation unit 774 to one or more data TLBs (DTLBs) 756. Or, in the case of a re-dispatch following a TLB miss, a logical memory address 793 corresponding to its source memory address information may be provided from a load buffer 791 of a memory order buffer (MOB) 790.

The upper bits of the logical memory address may be translated by the one or more DTLBs 756 to a physical memory address. For normal load operations, the physical memory address may be provided to a data cache tag array of a level 1 (L1) data cache 794 to start the memory lookup for the normal load operation. However, in some embodiments, since the special load operation does not actually load data, this may optionally be omitted for the special load operation. For example, the MOB may provide a cancel signal to the L1 data cache. In addition to the physical memory address, memory attributes and the TLB status signal may also be generated. When the address translation succeeds (e.g., there is a TLB hit), the one or more DTLBs may arbitrate for the writeback bus, and may transmit the physical memory address and the memory attributes (e.g., including the persistent type memory indication) on the writeback bus along with corresponding tags. Otherwise, if the address translation in the one or more DTLBs fails (e.g., there is a TLB miss), a block signal may be asserted.

The MOB 790 may perform blocking checks for normal load operations. For normal loads, these may include store data (STD) block, cache squash and DTLB page miss. If the full addresses for a pair of load/store are equal and valid, but the data is not available for the store, the load is blocked with the STD block. The STD block indicates that address and subsequent access are suitable for forwarding data to the load, but the STD operation of the store operation (e.g., the data calculation sub-operation of the store) has not yet dispatched from the scheduler unit (e.g., a reservation station). The load may be blocked until the scheduler unit dispatches the STD for execution. Once the STD occurs, the load in the load buffer may become unblocked. (e.g., can wake up) and be forwarded to the data from the STD operation. A cache squash (e.g., a data cache memory squash) may occur if there is already an access to the same cache line and may provide a performance gain since a second bus request or buffer does not have to be allocated. However, the MOB may be aware of the operation identifier of the special load operation, and in some embodiments, some of such blocking checks may optionally be omitted for the special load operation. In some embodiments, the special load operation may be predicted not to have any alias. In some embodiments, only the DTLB miss may apply to the special load operation. If the special load operation is blocked, it may be stored in an entry in the load buffer of the MOB, and wait there to be re-dispatched by a wakeup signal. Otherwise, the MOB may mark the special load operation as completed. In some embodiments, unless the special load operation encounters a DTLB miss, the special load operation need not be assigned to an ordered or in-order position in the MOB, since it doesn't load data.

The use of a special load operation instead of a special store operation may offer a possible advantage that load operations generally have an associated destination storage location but store operations often do not. Also, store operations may possibly affect compiler code optimization, for example, due to operation ordering constraints. But, if desired, a special store operation may instead optionally be used and it would generally not store data.

Figure 8:
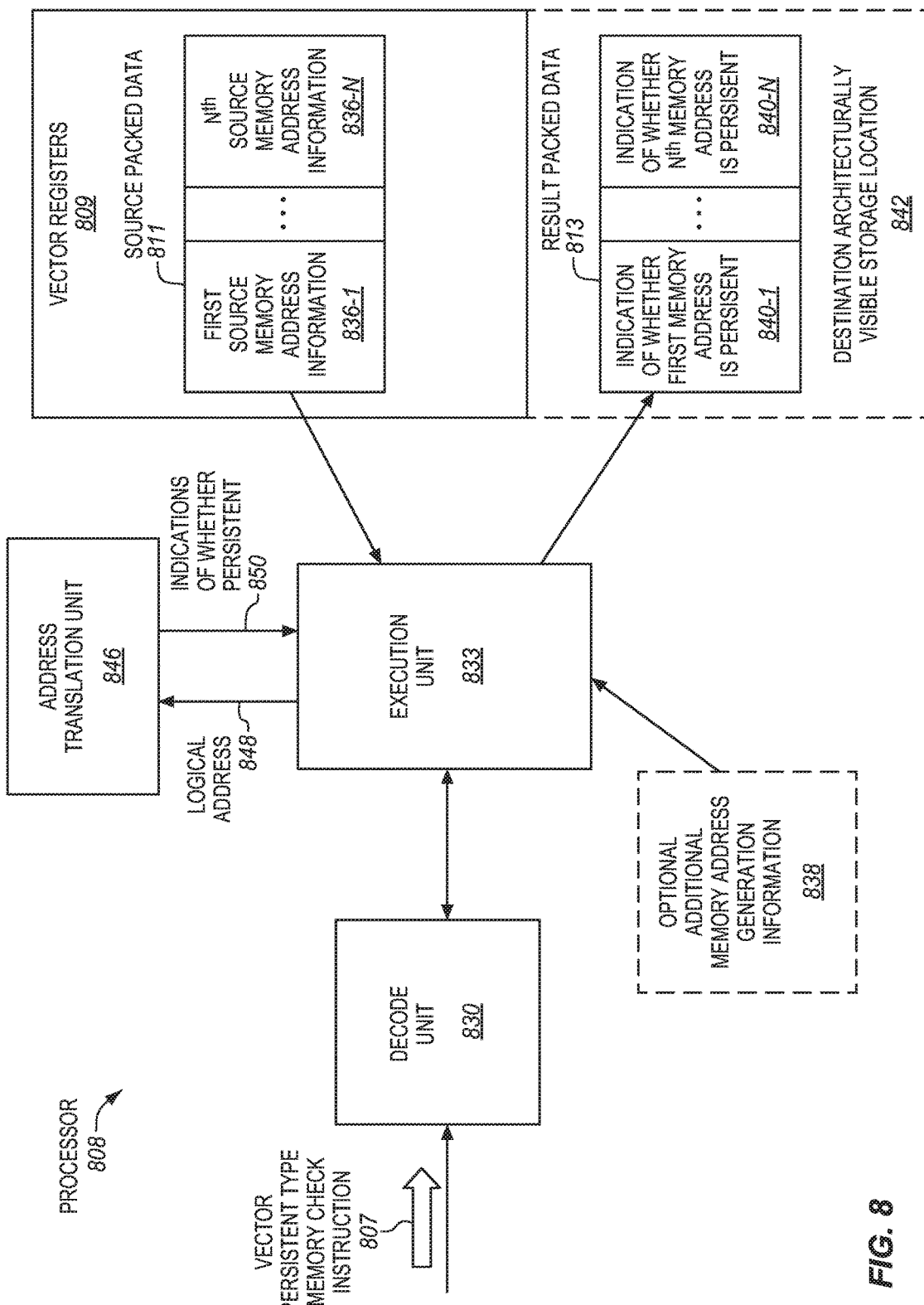
FIG. 8 is a block diagram of an embodiment of a processor that is operative to perform an embodiment of a vector persistent type memory check instruction.

FIG. 8 is a block diagram of an embodiment of a processor 808 that is operative to perform an embodiment of a vector persistent type memory check instruction. The processor 408 may optionally be the same as, similar to, or different than, the processor 308 of FIG. 3 and/or the processor 408 of FIG. 4. The processor 808 includes a decode unit 830, an execution unit 833, and an address translation unit 846. Each of these components, aside from processing the vector type of persistent type memory check instruction, may optionally be the same as, similar to, or different than, the correspondingly named components of FIG. 3 and/or FIG. 4. To avoid obscuring the description, the different and/or additional characteristics of the embodiment of FIG. 8 will primarily be described, without repeating all the characteristics which may optionally be the same as, or similar to, those previously described.

The decode unit 830 may receive and decode the vector persistent type memory check instruction 807. The vector persistent type memory check instruction may specify or otherwise indicate a source packed data or vector 811 having a plurality of source memory address information. Specifically, there may be a first source memory address information 836-1 through an Nth source memory address information 836-N, where the number of such information may optionally be two, four, eight, sixteen, thirty-two, or some other desired number. Each such information may optionally be similar to or the same as that described elsewhere herein (e.g., for 336). The vector persistent type memory check instruction may specify or otherwise indicate a destination architecturally-visible storage location 842.

An execution unit 833 is coupled with the decode unit. The execution unit may perform the vector persistent type memory check instruction. The execution unit may receive the source packed data 811. In some embodiments, the execution unit may also optionally receive additional memory address generation information 838, which may be similar to that described elsewhere herein (e.g., 338). In some embodiments, the execution unit 838 may be operative in response to and/or due to the vector persistent type memory check instruction 406 to use the plurality of source memory address information 836-1 through 836-N, and in some embodiments optionally the additional address generation information 338, to access the address translation unit 446 using a corresponding plurality of logical memory addresses 848. The address translation unit is coupled with the execution unit. The address translation unit may be operative to determine corresponding TLB entries or page table entries for the logical memory addresses. This may be done as previously described (e.g., for FIG. 3 and/or FIG. 4). The address translation unit may provide corresponding indications 850 of whether each of the logical memory addresses 848 is in persistent memory.

In some embodiments, the execution unit 838 may be operative in response to and/or due to the vector persistent type memory check instruction 406 to store a result packed data 813 in the indicated destination architecturally visible storage location. In some embodiments, the result packed data may include a plurality of indications that each indicate whether a corresponding logical memory address that corresponds to a corresponding one of the plurality of source memory address information (e.g., in a corresponding or same relative position within the packed data operands) is in a persistent memory. Specifically, the result packed data may include a first indication 840-1 of whether the first logical memory address is persistent through an Nth indication 840-N of whether the Nth logical memory address is persistent. In some embodiments, the destination architecturally-visible storage location 842 may optionally be one of the vector registers 809. In other embodiments, the destination architecturally-visible storage location 842 may optionally be a general purpose or other scalar register (e.g., a different set of one or more bits of which may correspond to each of the plurality of source memory address information 836).

Figure 9:
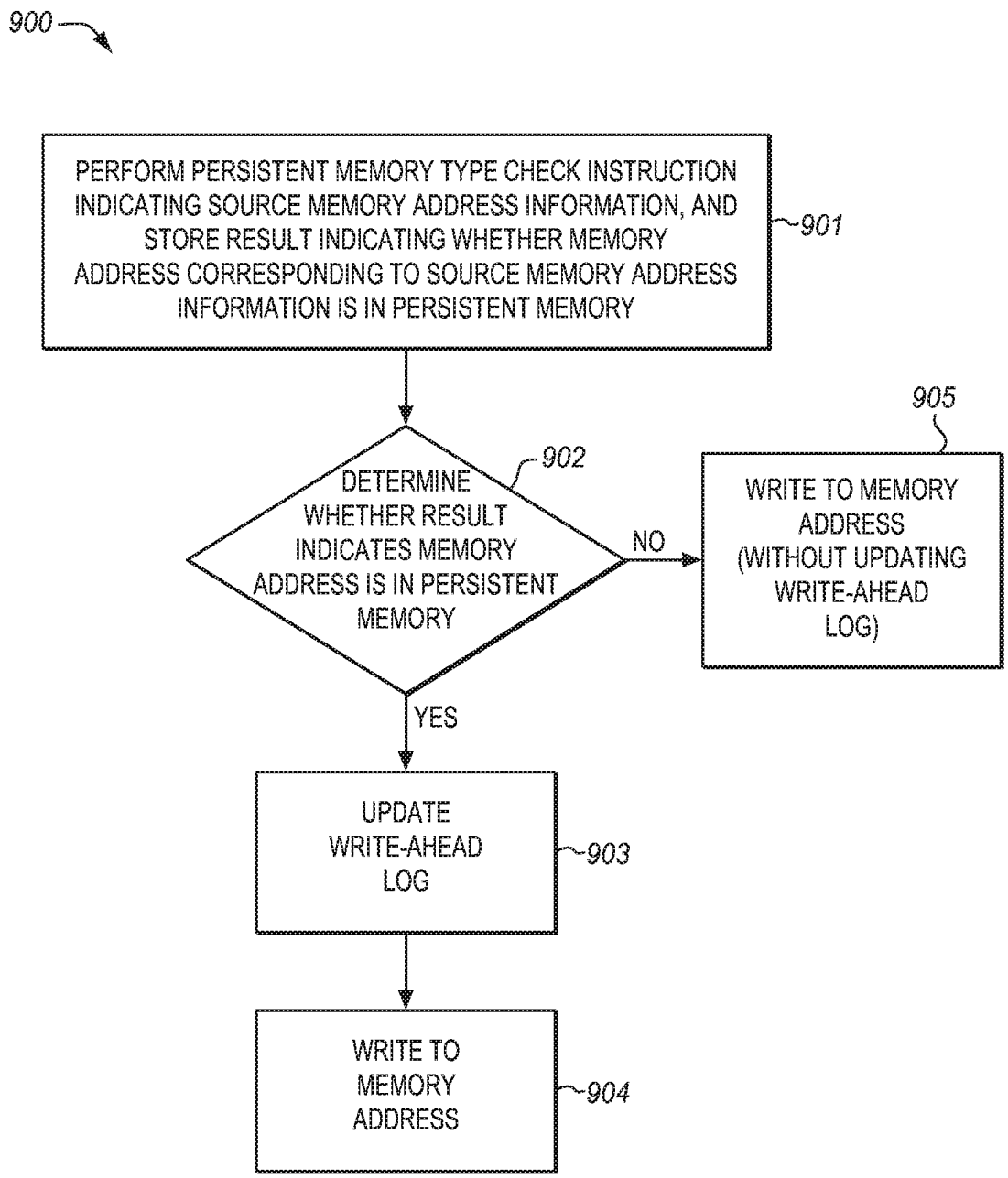
FIG. 9 is a block flow diagram of an example embodiment of a method of performing an embodiment of a persistent type memory check instruction, and using the result of the persistent type memory check instruction to determine whether or not to update a write-ahead log.

FIG. 9 is a block flow diagram of an example embodiment of a method 900 of performing an embodiment of a persistent type memory check instruction, and using the result of the persistent type memory check instruction to determine whether to update a write-ahead log. In various embodiments, the method may be performed by a processor, instruction processing apparatus, digital logic device, or integrated circuit. In some embodiments, the method may be performed by the processor 108 and/or the processor 308 and/or the processor 408. Alternatively, the method may be performed by and/or with a similar or different processor or apparatus and/or using a similar or different instruction. Moreover, the processor 108 and/or the processor 308 and/or the processor 408 may perform methods the same as, similar to, or different than the method 900.

The method includes performing the embodiment of the persistent type memory check instruction indicating source memory address information, and storing a result indicating whether a memory address corresponding to the source memory address information is in persistent memory, at block 901. This may optionally include performing any of the various embodiments of the persistent type memory check instructions disclosed elsewhere herein.

At block 902, a determination may be made whether the result of the persistent type memory check instruction (e.g., the result stored at block 901) indicates that the memory address (corresponding to the source memory address information of the persistent memory type check instruction) is in persistent memory. That is, the result may inform other instructions of the software, which may test this result. If the result indicates that the memory address is in the persistent memory (i.e., "yes" is the determination at block 902), the method may advance to block 903.

At block 903, the write ahead block may be updated. Generally, the write-ahead log is stored in the persistent memory. Typically, in order to write to the write-ahead log, one or more additional serialization instructions may also need to be performed. Possible examples of such serialization instructions include, but are not limited to, memory fence or barrier type instructions (e.g., a store fence instruction, a store and load fence instruction, etc.), a cache line flush instruction, a persistent commit instruction, or the like, and various combinations thereof depending upon the particular instructions, architecture, and need to ensure persistency. Such instructions may be used to help ensure that the updates to the write-ahead log get all the way to the persistent memory (e.g., are out of the various volatile storage structures of the processor) in proper order, and before the actual persistent memory update happens. However, one drawback with such serialization instructions is that they generally tend to have a relatively high performance cost. Due to this performance cost, it is generally beneficial to be able to know whether memory locations are in persistent memory or volatile memory, so that the write-ahead log can be selectively updated only when the memory locations are in persistent memory.

Then, at block 904, a write may be performed to the memory address (corresponding to the source memory address information of the persistent memory type check instruction) in the persistent memory. This occurs after the corresponding update of the write-ahead log.

Referring again to block 902, if instead the result does not indicate that the memory address is in the persistent memory (i.e., "no" is the determination), the method may advance to block 905. At block 905, a write may be performed to the memory address (corresponding to the source memory address information of the persistent memory type check instruction) in volatile memory. This may be done without updating the write-ahead log.

In some embodiments, as one possible use, code to implement the method 900 (e.g., a persistent type memory check instruction, a conditional control flow transfer instruction, etc.) may be inserted into software (e.g., user-level software) by a compiler. For example, in some embodiments, a code generator portion of the compiler may insert such code if a code analysis portion of the compiler cannot sufficiently determine that writes to memory are not updating persistent memory locations when changes to the persistent memory locations are supposed to first be reflected in the write-ahead log. As discussed above, this may tend to be the case when making such a determination depends upon runtime data, which may not be readily available to the compiler. As one illustrative example, the following code may be inserted into the function "foo" previously described above:

```
void foo(p_type *ptr){  //function "foo"
if(PTMCI(ptr) ){  //only if result of PTMCI indicates
ptr is persistent update log
    //write current value stored in *ptr to log before writing to ptr
    //perform one or more serializing instructions
} // else don't update log and instead proceed to update *ptr
*ptr =... //update *ptr within function foo
}
```

Recall that the function "foo" updates the pointer "ptr," which depending upon the condition evaluated in the previously described function "bar," may either be in persistent memory or volatile memory. In the code above, the persistent type memory check instruction (PTMCI) is performed before the update of the pointer "ptr" to check whether the pointer "ptr" is in persistent memory. If the pointer "ptr" is in the persistent memory, then the write-ahead log is updated and one or more serializing instructions are performed. Otherwise, if the result does not indicate that the pointer "ptr" is in the persistent memory, then the write-ahead is not updated. It is to be appreciated that this is just one illustrative example. In other cases, a persistent type memory check instruction as disclosed elsewhere herein may be included in code for other reasons besides write-ahead logging subject to the creativity of the programmer.

In a processor that performs branch prediction, the processor and/or a branch prediction unit may predict whether the condition (e.g., the above if statement "if(PTMCI(ptr))") is true or not (e.g., predict whether there is a branch or now). In some embodiments, if desired, the branch prediction may optionally be biased in favor of predicting in a way that the write-ahead log is not updated. Typically, the performance costs of the serialization instructions needed to update the write-ahead log are more significant than the performance costs associated with a branch miss-predication. When this is the case, it may be better in terms of performance to bias the branch in favor of predicting that the update to the write-ahead log is not needed. If the update to the write-ahead log was not in fact needed, then a branch miss-prediction penalty will not be incurred, and the performance penalty of updating the write-ahead log will not be incurred. Alternatively, if the update to the write-ahead log was needed, then a branch miss-prediction penalty will be incurred. However, the branch miss-prediction performance penalty will generally be less than the performance penalty of updating the write ahead log when unnecessary.

Various alternate embodiments to those described above are also contemplated. For example, in some embodiments, instead of the persistent indications being provided in page table entries and/or TLB entries, the persistent indications may instead be conveyed through range registers. For example, one or more range registers may be configured to indicate what regions of main memory are persistent, and an execution unit, in response to a persistent type memory check instruction, may check the range registers to determine whether a source memory address corresponds to persistent memory, and store a result to indicate the determination.

Further, in some embodiments, the persistent type check instruction may also incorporate or integrate a jump, branch, or other conditional control flow transfer operation that performs a control flow transfer based on whether the source memory address information corresponds to a memory location in persistent memory. In some such embodiments, the indication of whether the source memory address information corresponds to a memory location in persistent memory may optionally be stored in an architecturally visible destination storage location as described elsewhere herein, and the conditional control flow transfer operation may optionally check the indication in the architecturally visible destination storage location. In other such embodiments, the indication of whether the source memory address information corresponds to a memory location in persistent memory may optionally not be stored in the architecturally visible destination storage location, but rather may be used internally by the conditional control flow transfer operation to decide whether to perform a jump, branch, or other control flow transfer.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 11B:
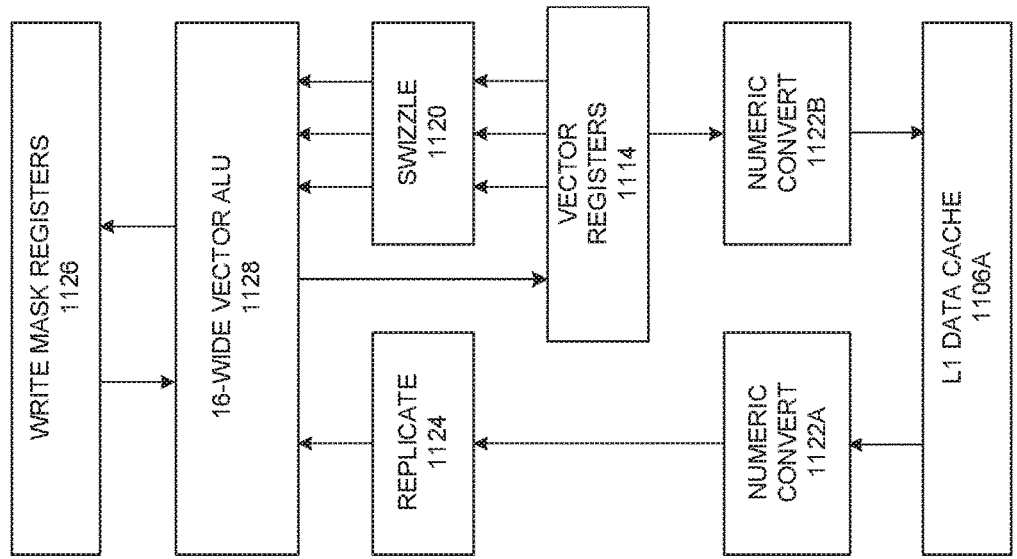
FIG. 11B is a block diagram of an embodiment of an expanded view of part of the processor core of FIG. 11A.
Figure 11A:
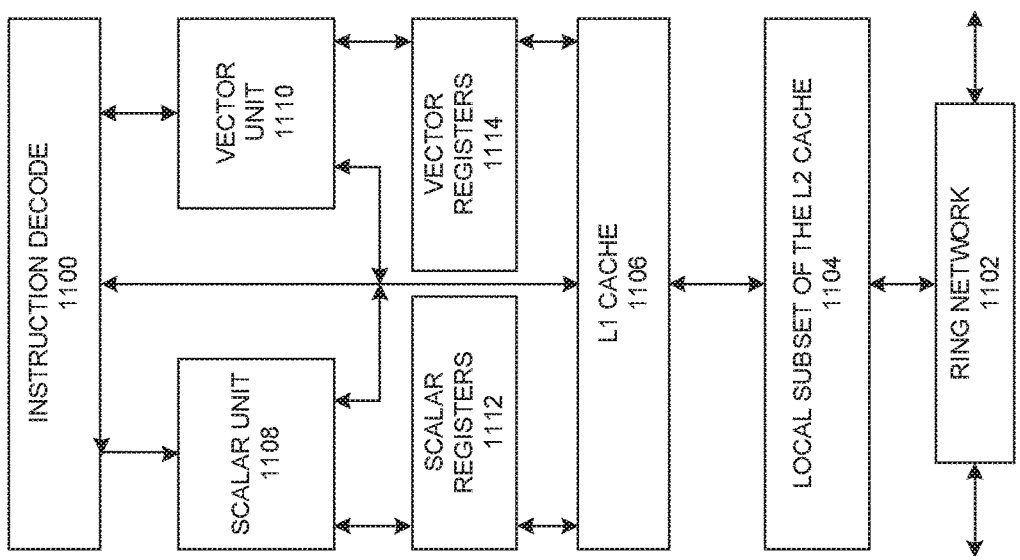
FIG. 11A is a block diagram of an embodiment of a single processor core, along with its connection to the on-die interconnect network, and with its local subset of the Level 2 (L2) cache.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 11112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
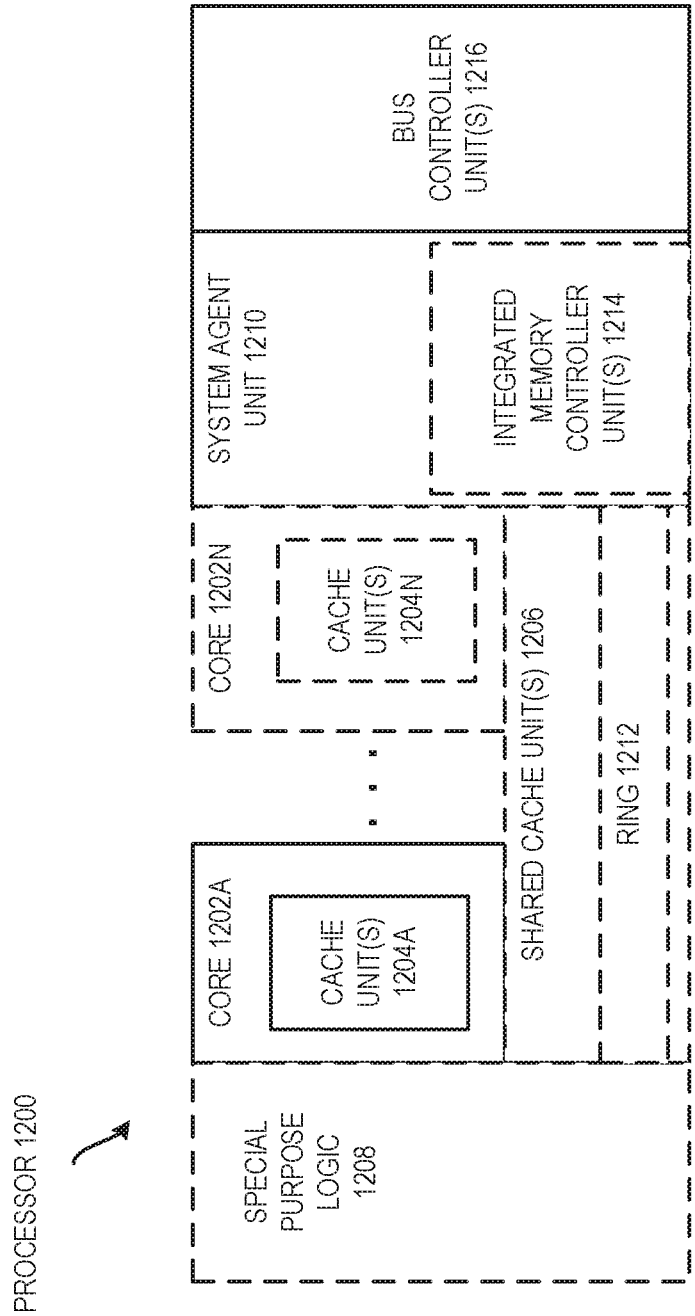
FIG. 12 is a block diagram of an embodiment of a processor that may have more than one core, may have an integrated memory controller, and may have integrated graphics.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
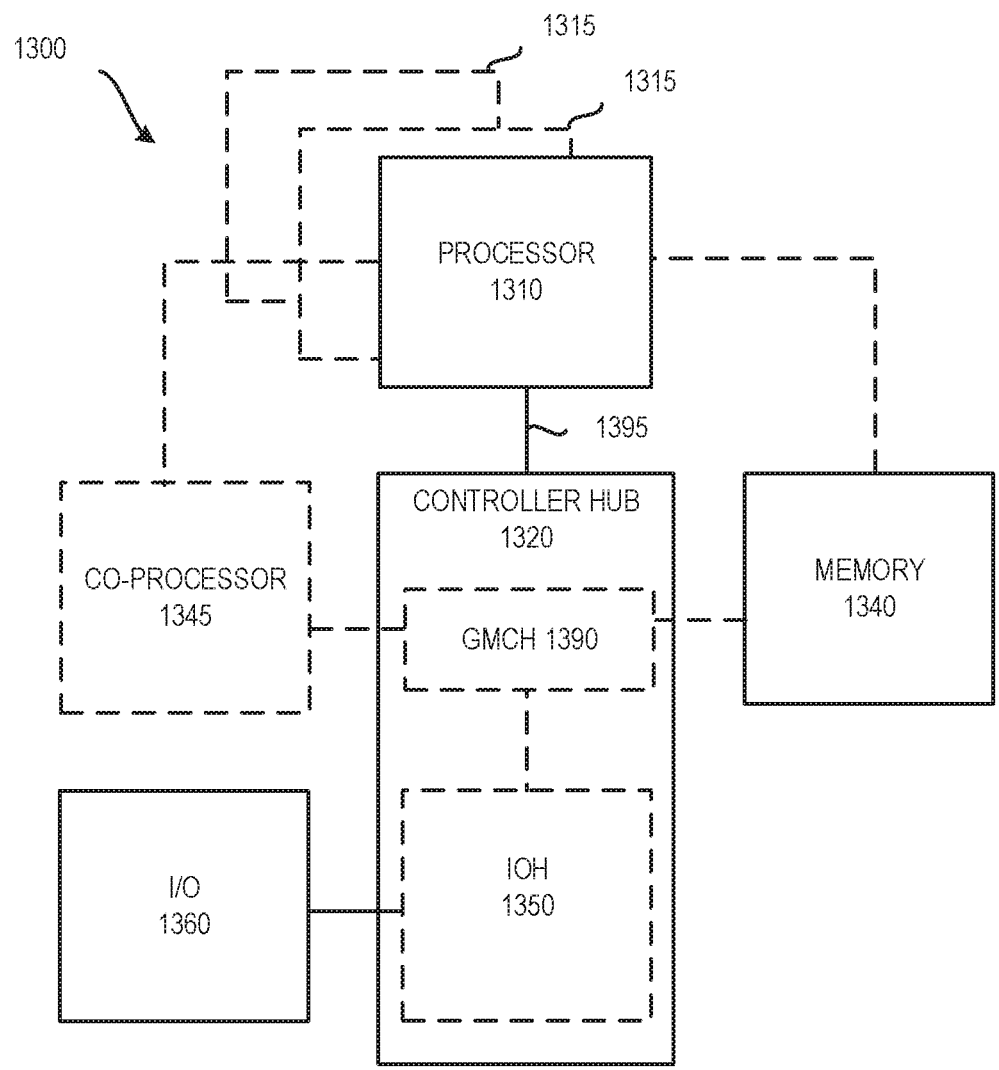
FIG. 13 is a block diagram of a first embodiment of a computer architecture.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
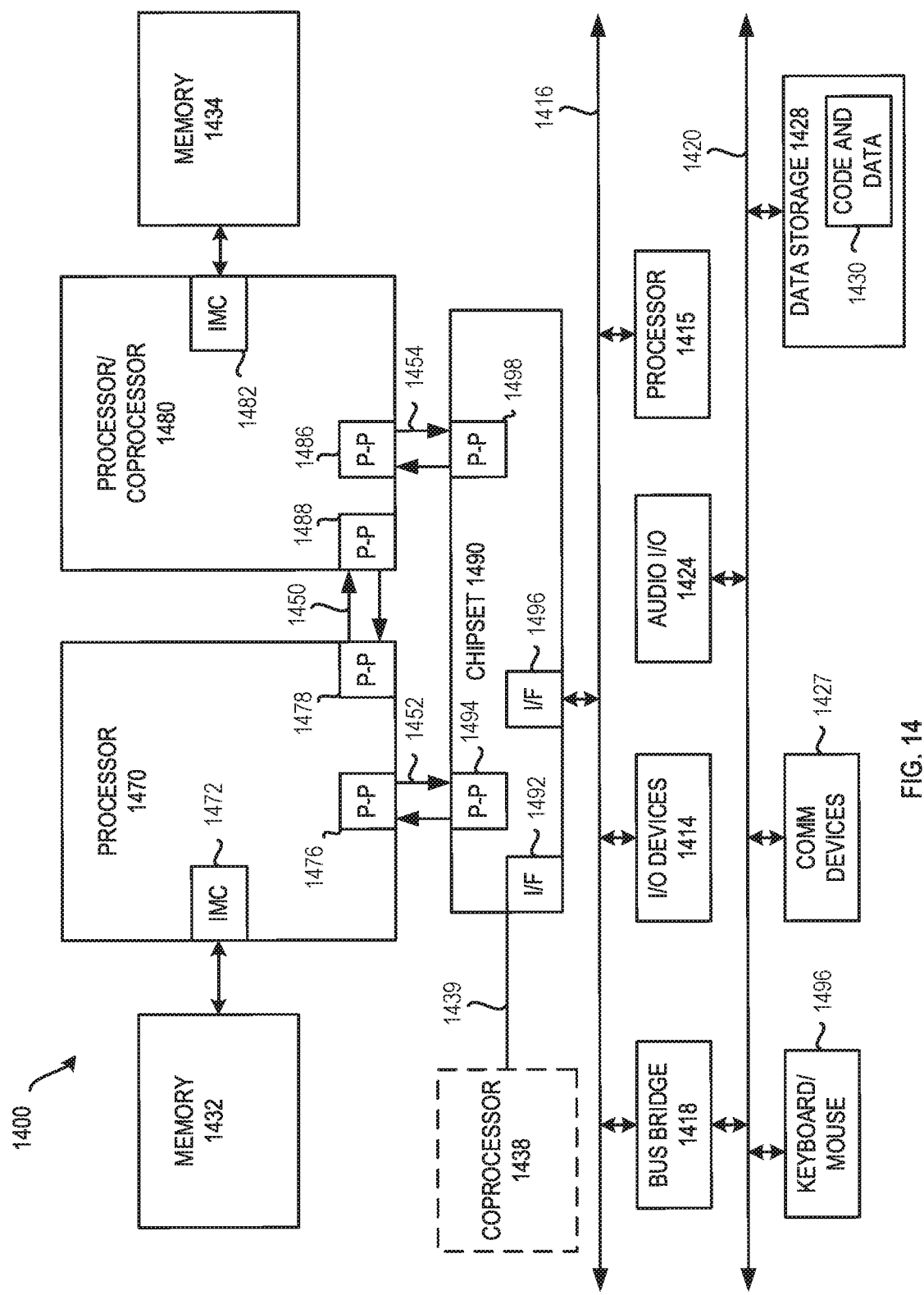
FIG. 14 is a block diagram of a second embodiment of a computer architecture.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
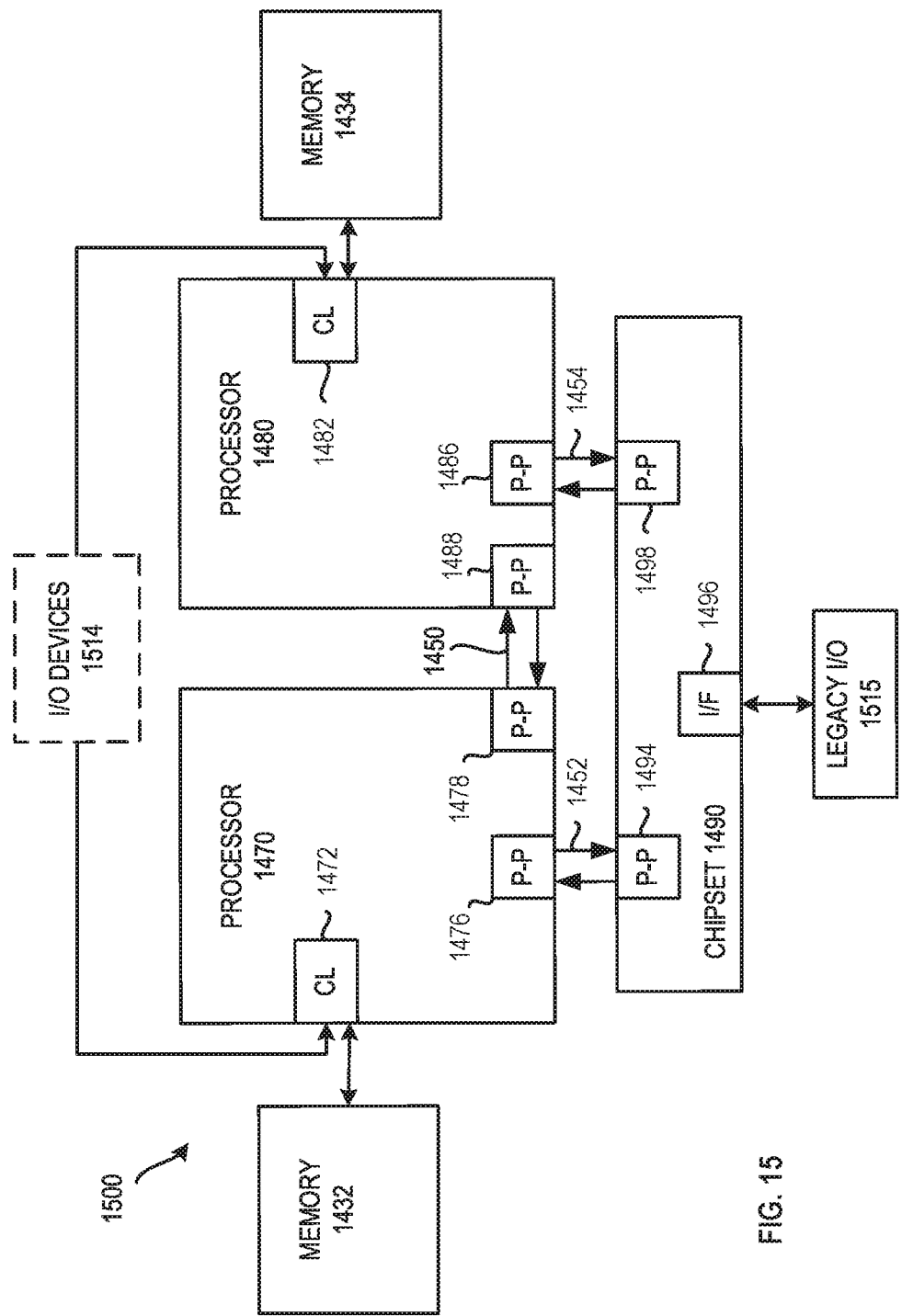
FIG. 15 is a block diagram of a third embodiment of a computer architecture.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
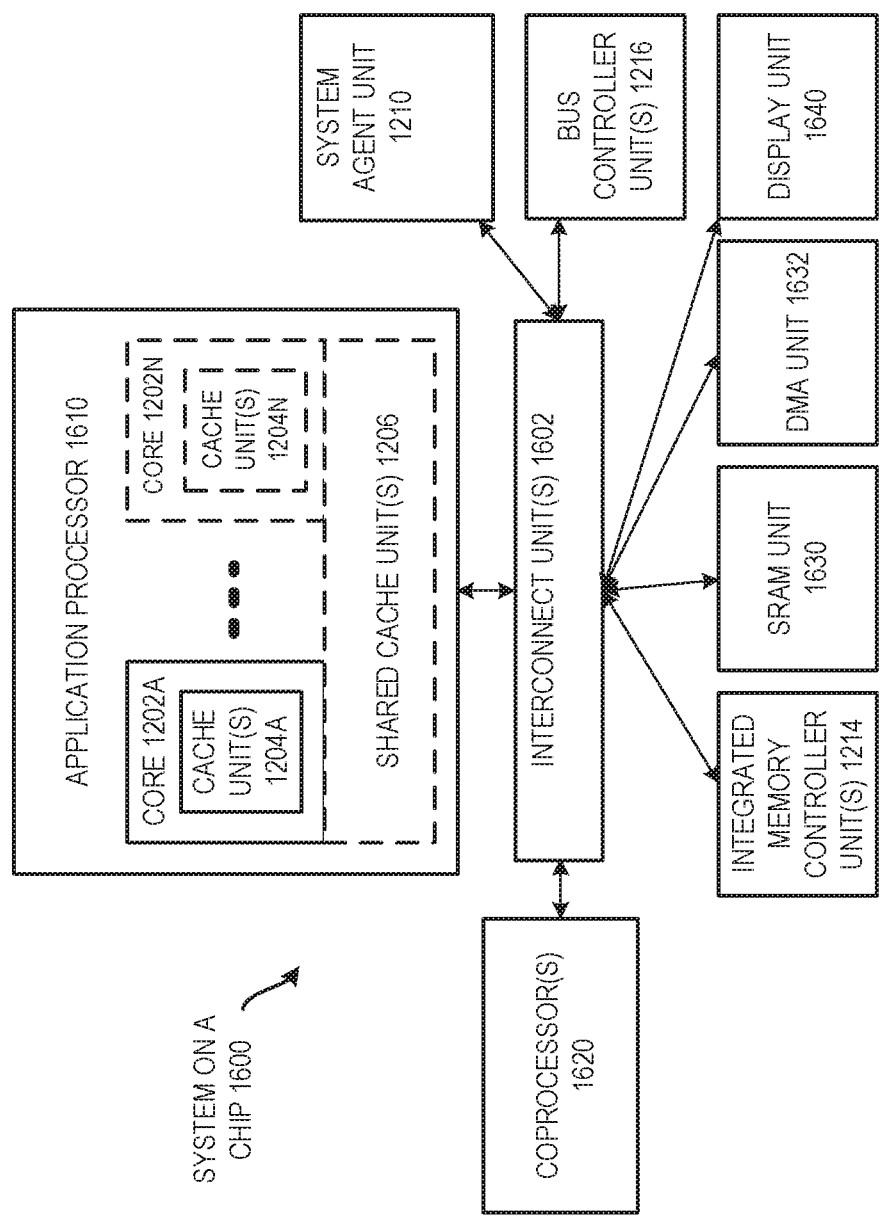
FIG. 16 is a block diagram of a fourth embodiment of a computer architecture.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 152A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
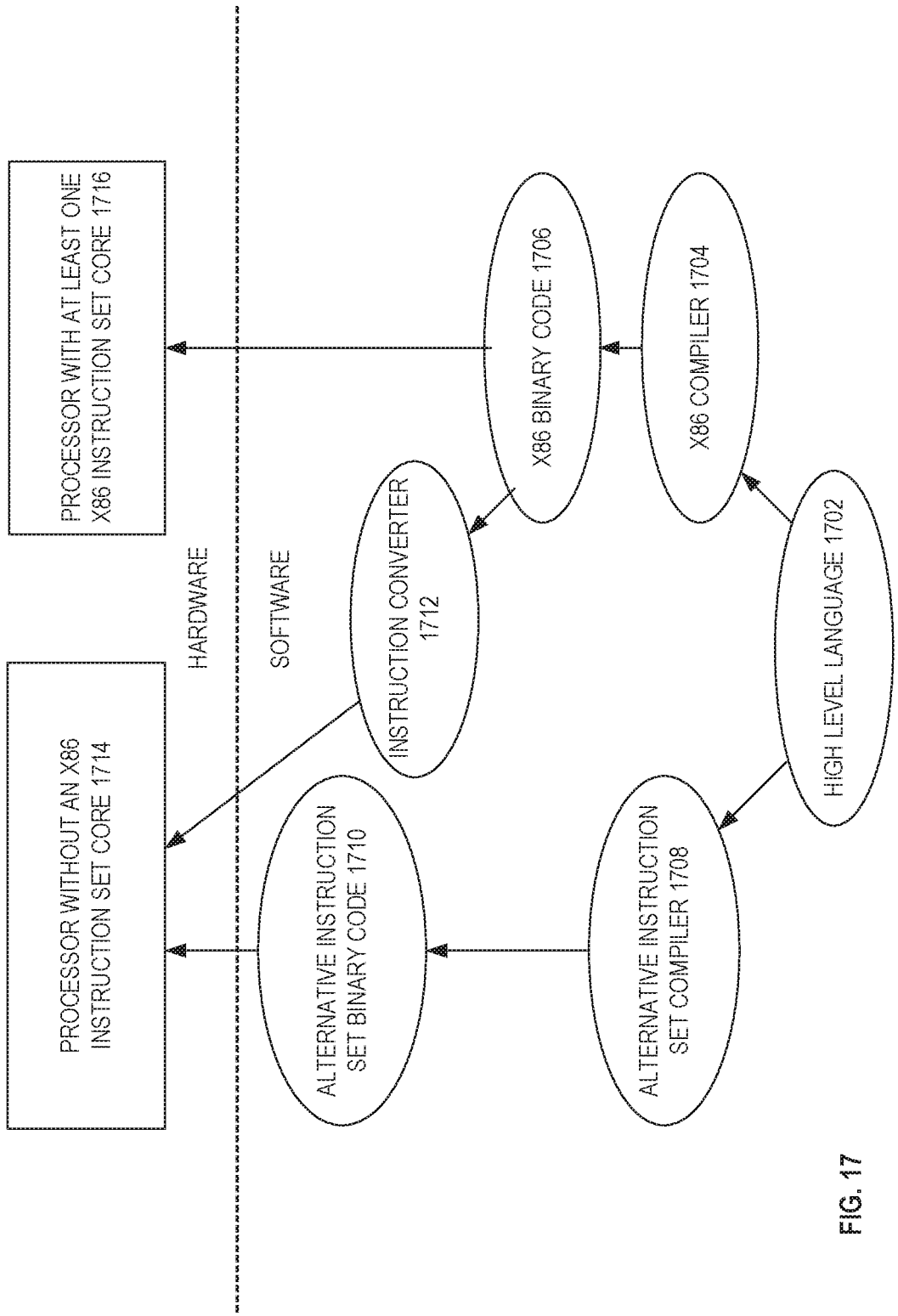
FIG. 17 is a block diagram of use of a software instruction converter to convert binary instructions in a source instruction set to binary instructions in a target instruction set, according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Components, features, and details described for any of FIGS. 4-7 may also optionally apply to any of FIGS. 2-3 and 8. Components, features, and details described for any of the processors disclosed herein may optionally apply to any of the methods disclosed herein, which in embodiments may optionally be performed by and/or with such processors. Any of the processors described herein in embodiments may optionally be included in any of the systems disclosed herein (e.g., any of the systems of FIGS. 13-16).

Processor components disclosed herein may be said to be operative, configured, capable, or able to perform an operation. For example, a decoder may be to decode an instruction, an execution unit may be to store a result, etc. For clarity, it is to be understood that these expressions do not imply that the processor components are in operation or use, but rather refer to what the processor components are capable of doing or able to do when they are in operation, but in the apparatus claims these processor components are not in operation.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a decode unit to decode an instruction. The instruction is to indicate a source memory address information, and the instruction is to indicate a destination architecturally-visible storage location. The processor also includes an execution unit coupled with the decode unit. The execution unit, in response to the instruction, is to store a result in the destination architecturally-visible storage location. The result is to indicate whether a logical memory address corresponding to the source memory address information is in a persistent memory.

Example 2 includes the processor of Example 1, further including a translation lookaside buffer (TLB). Also, optionally in which the execution unit, in response to the instruction, is to receive one or more bits, from an entry in the TBL that is to store an address translation for the logical memory address, which are to indicate whether the logical memory address is in the persistent memory.

Example 3 includes the processor of Example 2, further including a memory management unit (MMU). Also, optionally in which the MMU is to perform a page table walk to retrieve a page table entry, for an address translation for the logical memory address, which is to include one or more bits that are to indicate whether the logical memory address is in the persistent memory.

Example 4 includes the processor of Example 3, in which the one or more bits are to include one or more of bits [11:9] of the page table entry.

Example 5 includes the processor of any one of Examples 1 to 4, in which the execution unit, in response to the instruction, is to receive a plurality of bits including a persistent indication bit. Also, optionally in which the execution unit includes logic to apply a mask to isolate the persistent indication bit from the plurality of bits.

Example 6 includes the processor of Example 5, in which the execution unit includes a mask storage to store the mask, the mask to include a set bit for the persistent indication bit, and a cleared bit for each of the plurality of bits other than the persistent indication bit. Also, optionally the execution unit includes AND logic coupled with the mask storage, and coupled to receive the plurality of bits. Also, optionally in which the AND logic is to perform a bitwise logical AND operation on the plurality of bits and the mask and to output a bit value of the persistent indication bit.

Example 7 includes the processor of any one of Examples 1 to 6, in which the decode unit is to decode the instruction into a load operation. Also, optionally where the processor further includes a memory order buffer (MOB). Also, optionally in which the MOB is not to order the load operation with respect to other operations in a load buffer unless the load operation encounters a translation lookaside buffer (TLB) miss.

Example 8 includes the processor of any one of Examples 1 to 7, further including a data cache. Also, optionally in which the decode unit is to decode the instruction into a load operation, and in which the processor, in response to the load operation, is to provide a cancel signal to the data cache.

Example 9 includes the processor of any one of Examples 1 to 8, in which the decode unit is to decode the instruction into a load operation. Also, optionally where the processor further includes a memory order buffer (MOB). Also, optionally in which the MOB is not to perform one or more block operations for the load operation but the MOB is to perform the one or more block operations for other load operations that correspond to load instructions that when performed load data from memory into the processor.

Example 10 includes the processor of any one of Examples 1 to 9, further including a plurality of scalar registers. Also, optionally and in which the execution unit, in response to the instruction, is to store the result in the destination architecturally-visible storage location which is to be a scalar register of the plurality of scalar registers.

Example 11 includes the processor of any one of Examples 1 to 10, further including a flags register to store at least one flag. Also, optionally in which the execution unit, in response to the instruction, is to store the result in the destination architecturally-visible storage location which is to be the at least one flag of the flags register.

Example 12 includes the processor of any one of Examples 1 to 11, in which the execution unit, in response to the instruction, is to store the result that is to only include an indication of whether the logical memory address is in the persistent memory.

Example 13 includes the processor of any one of Examples 1 to 11, in which the execution unit, in response to the instruction, is to store the result that is to include a plurality of page attribute bits for a page corresponding to the logical memory address.

Example 14 includes the processor of any one of Examples 1 to 13, in which the decode unit is to decode the instruction which is to be a user-level instruction that is operative to be performed at a user-level privilege.

Example 15 is a method performed by a processor that includes receiving an instruction at the processor. The instruction indicating a source memory address information and indicating a destination architecturally-visible storage location. The method also includes storing a result in the destination architecturally-visible storage location, in response to the instruction. The result indicating whether a logical memory address corresponding to the source memory address information is in a persistent memory.

Example 16 includes the method of Example 15, further including receiving one or more bits from an entry in a translation lookaside buffer (TLB). Also, optionally in response to the instruction, the one or more bits indicating whether the logical memory address is in the persistent memory.

Example 17 includes the method of any one of Examples 15 to 16, further including decoding the instruction into a load operation. Also, optionally further including not ordering the load operation with respect to other operations in a load buffer of a memory order buffer unless the load operation encounters a translation lookaside buffer (TLB) miss.

Example 18 includes the method of any one of Examples 15 to 17, further including performing the instruction at a user-level privilege.

Example 19 includes the method of any one of Examples 15 to 18, further including determining to update a write-ahead log when the result indicates that the logical memory address is in the persistent memory.

Example 20 includes the method of any one of Examples 15 to 19, further including determining not to update the write-ahead log when the result indicates that the logical memory address is not in the persistent memory.

Example 21 includes the method of any one of Examples 15 to 20, further including a compiler inserting the instruction into code before a set of instructions that conditionally update the write-ahead log based on the result.

Example 22 includes the method of any one of Examples 15 to 21, further including biasing a branch prediction to predict a branch so that a set of instructions that update the write-ahead log are not performed.

Example 23 is an electronic device including an interconnect, and a processor coupled with the interconnect. The processor to receive an instruction that is to indicate a source memory address information, and is to indicate a destination architecturally-visible storage location. The processor, in response to the instruction, is to store a result in the destination architecturally-visible storage location. The result to indicate whether a logical memory address corresponding to the source memory address information is in a persistent memory. The electronic device further comprises at least one of a a dynamic random access memory (DRAM) and a persistent memory coupled with the interconnect. The DRAM and/or the persistent memory stores a set of instructions, the set of instructions, when executed by the processor, to cause the processor to perform operations including to either update a write-ahead log if the result is to indicate that the logical memory address is in the persistent memory, or to not update the write-ahead log if the result is to indicate that the logical memory address is not in the persistent memory.

Example 24 includes the electronic device of Example 23, in which the processor further includes a translation lookaside buffer (TLB). Also, optionally in which the processor, in response to the instruction, is to receive one or more bits from an entry in the TBL that is to store an address translation for the logical memory address, which are to indicate whether the logical memory address is in the persistent memory.

Example 25 includes the processor of any one of Examples 1 to 14, further including an optional branch prediction unit to predict branches, and an optional instruction prefetch unit, coupled with the branch prediction unit, the instruction prefetch unit to prefetch instructions including the persistent type memory check instruction. The processor may also optionally include an optional level 1 (L1) instruction cache coupled with the instruction prefetch unit, the L1 instruction cache to store instructions including the persistent type memory check instruction, an optional L1 data cache to store data, and an optional level 2 (L2) cache to store data and instructions including the persistent type memory check instruction. The processor may also optionally include an instruction fetch unit coupled with the decode unit, the L1 instruction cache, and the L2 cache, to fetch the persistent type memory check instruction, in some cases from one of the L1 instruction cache and the L2 cache, and to provide the persistent type memory check instruction to the decode unit. The processor may also optionally include a register rename unit to rename registers, an optional scheduler to schedule one or more operations that have been decoded from the persistent type memory check instruction for execution, and an optional commit unit to commit execution results of the persistent type memory check instruction.

Example 26 includes a system-on-chip that includes at least one interconnect, the processor of any one of Examples 1 to 14 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 27 is a processor or other apparatus operative to perform the method of any one of Examples 15 to 22.

Example 28 is a processor or other apparatus that includes means for performing the method of any one of Examples 15 to 22.

Example 29 is an optionally non-transitory and/or tangible machine-readable medium, which optionally stores or otherwise provides instructions including a first instruction, the first instruction if and/or when executed by a processor, computer system, electronic device, or other machine, is operative to cause the machine to perform the method of any one of Examples 15 to 22.

Example 30 is a processor or other apparatus substantially as described herein.

Example 31 is a processor or other apparatus that is operative to perform any persistent type memory check instruction substantially as described herein.

Example 32 is a processor or other apparatus that includes means for decoding an instruction, the instruction to indicate a source memory address information, and the instruction to indicate a destination architecturally-visible storage location. The apparatus also includes means for storing a result in the destination architecturally-visible storage location in response to the instruction, the result to indicate whether a logical memory address corresponding to the source memory address information is in a persistent memory.

What is claimed is:
1. A method performed by a processor comprising:
   receiving an instruction at the processor, the instruction indicating a source memory address information and indicating a destination architecturally-visible storage location;
   storing a result in the destination architecturally-visible storage location, in response to the instruction, the result indicating whether a logical memory address corresponding to the source memory address information is in a persistent memory that is byte-addressable; and not load data from, or store data to, either main memory or caches of the processor, in response to the instruction.

2. The method of claim 1, further comprising receiving one or more bits from an entry in a translation lookaside buffer (TLB), in response to the instruction, the one or more bits indicating whether the logical memory address is in the persistent memory.

3. The method of claim 1, further comprising decoding the instruction into a load operation, and further comprising not ordering the load operation with respect to other operations in a load buffer of a memory order buffer unless the load operation encounters a translation lookaside buffer (TLB) miss.

4. The method of claim 1, further comprising performing the instruction at a user-level privilege.

5. The method of claim 1, further comprising determining to update a write-ahead log when the result indicates that the logical memory address is in the persistent memory.

6. The method of claim 1, further comprising determining not to update the write-ahead log when the result indicates that the logical memory address is not in the persistent memory.

7. The method of claim 1, further comprising a compiler inserting the instruction into code before a set of instructions that conditionally update a write-ahead log based on the result.

8. The method of claim 1, further comprising biasing a branch prediction to predict a branch so that a set of instructions that conditionally update a write-ahead log based on the result are not performed.

9. A processor comprising:
a decode unit to decode an instruction, the instruction to indicate a source memory address information, and the instruction to indicate a destination architecturally-visible storage location; and
an execution unit coupled with the decode unit, the execution unit, in response to the instruction, to:
store a result in the destination architecturally-visible storage location, the result to indicate whether a logical memory address corresponding to the source memory address information is in a persistent memory that is byte-addressable; and
not load data from, or store data to, either main memory or caches of the processor.

10. The processor of claim 9, further comprising a translation lookaside buffer (TLB), and wherein the execution unit, in response to the instruction, is to receive one or more bits, from an entry in the TLB that is to store an address translation for the logical memory address, which are to indicate whether the logical memory address is in the persistent memory.

11. The processor of claim 10, further comprising a memory management unit (MMU), and wherein the MMU is to perform a page table walk to retrieve a page table entry, for an address translation for the logical memory address, which is to include one or more bits that are to indicate whether the logical memory address is in the persistent memory.

12. The processor of claim 11, wherein the decode unit is to decode the instruction that is to explicitly specify a first general-purpose register that is to store the source memory address information, and that is to explicitly specify a second general-purpose register as the destination architecturally-visible storage location.

13. The processor of claim 9, wherein the execution unit, in response to the instruction, is to receive a plurality of bits including a persistent indication bit, and wherein the execution unit comprises logic to apply a mask to isolate the persistent indication bit from the plurality of bits.

14. The processor of claim 13, wherein the execution unit comprises:
a mask storage to store the mask, the mask to include a set bit for the persistent indication bit, and a cleared bit for each of the plurality of bits other than the persistent indication bit; and
AND logic coupled with the mask storage, and coupled to receive the plurality of bits, the AND logic to perform a bitwise logical AND operation on the plurality of bits and the mask and to output a bit value of the persistent indication bit.

15. The processor of claim 9, wherein the decode unit is to decode the instruction into a load operation, further comprising a memory order buffer (MOB), and wherein the MOB is not to order the load operation with respect to other operations in a load buffer unless the load operation encounters a translation lookaside buffer (TLB) miss.

16. The processor of claim 9, further comprising a data cache, wherein the decode unit is to decode the instruction into a load operation, and wherein the processor, in response to the load operation, is to provide a cancel signal to the data cache.

17. The processor of claim 9, wherein the decode unit is to decode the instruction into a load operation, further comprising a memory order buffer (MOB), and wherein the MOB is not to perform one or more block operations for the load operation but the MOB is to perform the one or more block operations for other load operations that correspond to load instructions that when performed load data from memory into the processor.

18. The processor of claim 9, further comprising a plurality of scalar registers, and wherein the execution unit, in response to the instruction, is to store the result in the destination architecturally-visible storage location which is to be a scalar register of the plurality of scalar registers.

19. The processor of claim 9, further comprising a flags register to store at least one flag, and wherein the execution unit, in response to the instruction, is to store the result in the destination architecturally-visible storage location which is to be the at least one flag of the flags register.

20. The processor of claim 9, wherein the execution unit, in response to the instruction, is to store the result that is to only include an indication of whether the logical memory address is in the persistent memory.

21. The processor of claim 9, wherein the execution unit, in response to the instruction, is to store the result that is to include a plurality of page attribute bits for a page corresponding to the logical memory address.

22. The processor of claim 9, wherein the decode unit is to decode the instruction which is to be a user-level instruction that is operative to be performed at a user-level privilege.

23. An electronic device comprising:
an interconnect;
a processor coupled with the interconnect, the processor to receive an instruction that is to indicate a source memory address information, and is to indicate a destination architecturally-visible storage location, the processor, in response to instruction, to:
store a result in the destination architecturally-visible storage location, the result to indicate whether a logical memory address corresponding to the source memory address information is in a persistent memory that is byte-addressable; and not load data from, or store data to, either main memory or caches of the processor; and a dynamic random access memory (DRAM) coupled with the interconnect, the DRAM storing a set of instructions, the set of instructions, when executed by the processor, to cause the processor to perform operations comprising to:

update a write-ahead log if the result is to indicate that the logical memory address is in the persistent memory; or not update the write-ahead log if the result is to indicate that the logical memory address is not in the persistent memory.

24. The electronic device of claim 23, wherein the processor further comprises a translation lookaside buffer (TLB), and wherein the processor, in response to the instruction, is to receive one or more bits, from an entry in the TBL that is to store an address translation for the logical memory address, which are to indicate whether the logical memory address is in the persistent memory.

* * * * *